(12) United States Patent
Sung et al.

(10) Patent No.: US 10,959,061 B2
(45) Date of Patent: Mar. 23, 2021

(54) METHOD FOR ACQUIRING USER INFORMATION AND ELECTRONIC DEVICE THEREFOR

(71) Applicant: Samsung Electronics Co., Ltd., Gyeonggi-do (KR)

(72) Inventors: Dukgu Sung, Seoul (KR); Yunsun Baek, Gyeonggi-do (KR); Jaewoong Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/615,554

(22) PCT Filed: May 28, 2018

(86) PCT No.: PCT/KR2018/006019
§ 371 (c)(1),
(2) Date: Nov. 21, 2019

(87) PCT Pub. No.: WO2018/217072
PCT Pub. Date: Nov. 29, 2018

(65) Prior Publication Data
US 2020/0178045 A1    Jun. 4, 2020

(30) Foreign Application Priority Data

May 26, 2017    (KR) .................. 10-2017-0065206

(51) Int. Cl.
*H04W 4/10*        (2009.01)
*H04L 29/06*       (2006.01)
*H04W 8/18*        (2009.01)

(52) U.S. Cl.
CPC ........... *H04W 4/10* (2013.01); *H04L 65/4038* (2013.01); *H04W 8/18* (2013.01)

(58) Field of Classification Search
CPC ......... H04W 4/10; H04W 76/45; H04W 4/08; H04W 84/08; H04W 8/18; H04W 76/10
See application file for complete search history.

(56) References Cited

U.S. PATENT DOCUMENTS

| | | |
|---|---|---|
| 2005/0153724 A1 | 7/2005 | Vij et al. |
| 2006/0019692 A1 | 1/2006 | Huh et al. |
| 2006/0040686 A1 | 2/2006 | Lee |

(Continued)

FOREIGN PATENT DOCUMENTS

| | | |
|---|---|---|
| KR | 10-0652646 B1 | 12/2006 |
| KR | 10-0842144 B1 | 6/2008 |

(Continued)

*Primary Examiner* — Keith Ferguson
(74) *Attorney, Agent, or Firm* — Cha & Reiter. LLC.

(57) ABSTRACT

The present invention relates to acquisition of user information by an electronic device, and comprises a communication module, a display, a processor, and a memory. The communication module and the display according to various embodiments are electrically connected to the processor. The processor is electrically connected to the memory. The memory causes the processor to: receive media information which does not include utterer information, perform signaling for acquisition of utterer information related to the media information, and determine and display the utterer information. Various other embodiments are possible.

13 Claims, 13 Drawing Sheets

(56) References Cited

U.S. PATENT DOCUMENTS

2006/0223459 A1   10/2006  Maggenti
2009/0156246 A1*  6/2009  Toba ..................... H04W 76/45
                                                                 455/518
2015/0237483 A1*  8/2015  Shimizu ................ H04L 51/26
                                                                  455/512

FOREIGN PATENT DOCUMENTS

| KR | 10-0878355 B1 | 1/2009 |
| KR | 10-0948743 B1 | 3/2010 |
| KR | 10-1104704 B1 | 1/2012 |

* cited by examiner

METHOD FOR ACQUIRING USER INFORMATION AND ELECTRONIC DEVICE THEREFOR

CROSS REFERENCE TO RELATED APPLICATIONS

This application is a National Phase Entry of PCT International Application No. PCT/KR2018/006019, which was filed on May 28, 2018, and claims a priority to Korean Patent Application No. 10-2017-0065206, which was filed on May 26, 2017, the contents of which are incorporated herein by reference.

TECHNICAL FIELD

Various embodiments of the disclosure relate to a mission-critical push-to-talk (MCPTT), and more particularly to a method for acquiring user information and an electronic device therefor.

BACKGROUND ART

As the performance of portable electronic devices such as smart phones has increased, various services have come to be provided through the electronic devices. For example, in addition to basic services, such as phone calls and text message transmission, services are expanding to more complex service areas, such as gaming, messaging, document editing, image/video reproduction and editing, etc. As various services are now provided through electronic devices, various functions other than simple data input/output and processing thereof are required.

In addition to various personal services provided through the electronic device, services that meet the demand for public safety are gradually growing. Most of all, public safety/long-term evolution (PS-LTE) provides a user with a communication service for public safety in a disaster situation using a mission-critical push-to-talk (MCPTT) technology. In addition to wired MCPTT based on a server and a client, device-to-device (D2D)-based off-network MCPTT technology may be used when a communication network infrastructure has been destroyed or a communication infrastructure does not exist.

DISCLOSURE OF INVENTION

Technical Problem

Unlike a server-based MCPTT service, the communication quality of which is assuredly guaranteed and which uses a centralized floor control server, in the case where a D2D-based off-network MCPTT service uses a device-to-device communication scheme, a number of anonymous utterances may occur. For example, in the case where packet loss occurs due to relatively low communication quality, a new user participates in a D2D communication range during an utterance, or two or more floor arbitrators exist, an anonymous utterance, for which utterer information cannot be identified, may occur even though an electronic device receives media information.

As described above, various embodiments may provide an apparatus and method for acquiring information of an anonymous utterer.

Solution to Problem

According to various embodiments, an electronic device may include a communication module, a display, at least one processor, and a memory. The communication module and the display according to various embodiments may be electrically connected to the at least one processor. The at least one processor may be electrically connected to the memory. The memory may cause the at least one processor to: receive media information that does not include utterer information; perform signaling for acquisition of utterer information relating to the media information, and determine and display the utterer information.

According to various embodiments, an operation method of an electronic device may include: receiving media information that does not include utterer information; performing signaling for acquisition of utterer information relating to the media information; and determining and displaying the utterer information.

Advantageous Effects of Invention

A method and an electronic device therefor according to various embodiments may acquire utterer information using a floor control message. Accordingly, it is possible to reduce the incidence of anonymous utterances that have previously occurred and improve the quality of service in a public safety network.

BEST MODE FOR CARRYING OUT THE INVENTION

Figure 1:
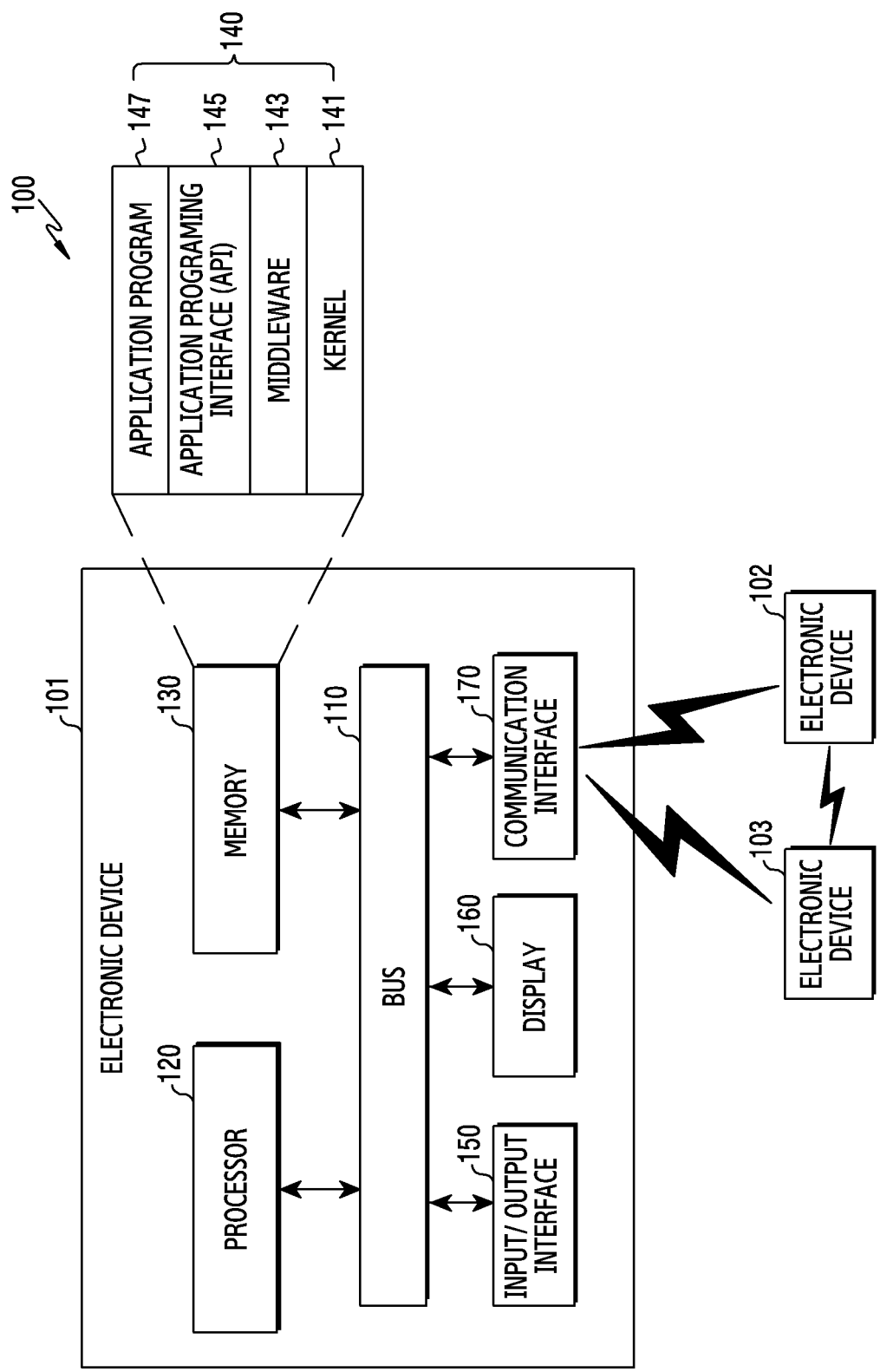
FIG. 1 illustrates an electronic device within a network environment according to various embodiments of the disclosure.

Hereinafter, various embodiments will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, the expression "A or B" or "at least one of A and/or B" may include all possible combinations of items enumerated together. The expression "a first", "a second", "the first", or "the second" may modify various elements regardless of the order and/or the importance thereof, and is used merely to distinguish one element from another element, without limiting the corresponding elements. When an element (e.g., a first element) is referred to as being "(functionally or communicatively) connected", or "directly coupled" to another element (a second element), the element may be connected directly to the another element, or may be connected to the another element through yet another element (e.g., a third element).

The expression "configured to" as used in various embodiments may be interchangeably used with, for example, "suitable for", "having the capacity to", "adapted to", "made to", "capable of", or "designed to" in terms of hardware or software, depending on the circumstances. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a general purpose processor (e.g., a central processing unit (CPU) or application processor (AP)) that can perform the corresponding operations by executing one or more software programs stored in a memory device.

An electronic device according to various embodiments herein may include, for example, at least one of a smartphone, a tablet PC, a mobile phone, a video phone, an e-book reader, a desktop PC, a laptop PC, a netbook computer, a workstation, and a server.

The electronic device according to an embodiment herein is not limited to what is described above. In the disclosure, the term "user" may indicate a person using an electronic device or a device (e.g., an artificial intelligence electronic device) using an electronic device.

Referring to FIG. 1, an electronic device 101 resides in a network 100 according to various embodiments. The electronic device 101 can include a bus 110, a processor 120, a memory 130, an input/output interface 150, a display 160, and a communication interface 170. In an embodiment, the electronic device 101 can omit at least one of the components or further include an additional component. The bus 110 can include a circuit for connecting the components 120 through 170 and delivering communication signals (e.g., control messages or data) between the components 120 through 170. The processor 120 can include one or more of a CPU, an AP, and a Communication Processor (CP). The processor 120, for example, can perform an operation or data processing regarding control and/or communication of at least other component of the electronic device 101.

The memory 130 can include a volatile and/or nonvolatile memory. The memory 130, for example, can store commands or data relating to at least other component of the electronic device 101. According to an embodiment, the memory 130 can store software and/or a program 140. The program 140 can include a kernel 141, middleware 143, an Application Programming Interface (API) 145, and/or an application program (or "application") 147. At least part of the kernel 141, the middleware 143, or the API 145 can be referred to as an Operating System (OS). The kernel 141 can control or manage system resources (e.g., the bus 110, the processor 120, or the memory 130) used for performing operations or functions implemented by the other programs (e.g., the middleware 134, the API 145, or the application program 147). Additionally, the kernel 141 can provide an interface for controlling or managing the system resources by accessing an individual component of the electronic device 101 from the middleware 143, the API 145, or the application program 147.

The middleware 143 may function as, for example, an intermediary for allowing the API 145 or the application programs 147 to communicate with the kernel 141 to exchange data therewith. Furthermore, the middleware 143 may process one or more task requests, which are received from the application programs 147, according to priorities thereof. For example, the middleware 143 may assign priorities for using system resources (for example, the bus 110, the processor 120, the memory 130, or the like) of the electronic device 101 to one or more of the application programs 147, and may process the one or more task requests. The API 145, as an interface through which the application 147 controls a function provided from the kernel 141 or the middleware 143, can include, for example, at least one interface or function (e.g., an instruction) for file control, window control, image processing, or character control. The input/output interface 150, for example, can serve as an interface for delivering commands or data inputted from a user or another external device to other component(s) of the electronic device 101. Also, the input/output interface 150 can output commands or data inputted from the other component(s) of the electronic device 101 to the user or another external device.

The display 160, for example, can include a Liquid Crystal Display (LCD), a Light Emitting Diode (LED) display, an Organic Light Emitting Diode (OLED) display, a MicroElectroMechanical Systems (MEMS) display, or an electronic paper display. The display 160, for example, can display various contents (e.g., texts, images, videos, icons, or symbols) to the user. The display 160 can include a touch screen, for example, and receive touch, gesture, proximity, or hovering inputs by using an electronic pen or a user's body part. The communication interface 170, for example, can set a communication between the electronic device 101 and an external device (e.g., a first external electronic device 102, a second external electronic device 103). For example, the communication interface 170 can communicate with the external device (e.g., the second external electronic device 103) over a network 162 using wireless communication or wired communication.

The wireless communication may include cellular communication that uses, for example, at least one of long-term evolution (LTE), LTE-advance (LTE-A), code division multiple access (CDMA), wideband CDMA (WCDMA), universal mobile telecommunications system (UMTS), WiBro (Wireless Broadband), global system for mobile communications (GSM), etc. According to an embodiment, the wireless communication may include, for example, at least one of wireless fidelity (Wi-Fi), light fidelity (Li-Fi), Bluetooth, Bluetooth low energy (BLE), ZigBee, near field communication (NFC), magnetic secure transmission, radio frequency (RF), or a body area network (BAN). According to an embodiment, the wireless communication may include a global navigation satellite system (GNSS). The GNSS may be, for example, global positioning system (GPS), global navigation satellite system (GLONASS), Beidou navigation satellite system (hereinafter, "Beidou") or Galileo, the European global satellite-based navigation system. Hereinafter, in this disclosure, the term "GPS" may be interchangeable with the term "GNSS". The wired communication may include, for example, at least one of a universal serial bus (USB), a high definition multimedia interface (HDMI), recommended standard 232 (RS-232), power line communication, or a plain old telephone service (POTS), and the like. The network 162 may include a telecommunications network, for example, at least one of a computer network (for example, a LAN or a WAN), the Internet, and a telephone network.

Each of the first and second external electronic devices 102 and 103 can be of the same as or of a different type from the type of the electronic device 101. According to various embodiments, all or part of the operations executed in the electronic device 101 can be executed by one or more other electronic devices (e.g., the electronic devices 102 and 103). When the electronic device 101 is to perform a function or service automatically or by request, instead of or addition to performing the function or the service by the electronic device 101, the electronic device 101 can request at least part of the related function from other device (e.g., the electronic device 102 or 103). The other electronic device (e.g., the electronic device 102 or 103) can perform the requested function or an additional function and provide its result to the electronic device 101. The electronic device 101 can provide the requested function or service by processing the received result as it is or additionally. In doing so, for example, cloud computing, distributed computing, or client-server computing techniques can be used.

Figure 2:
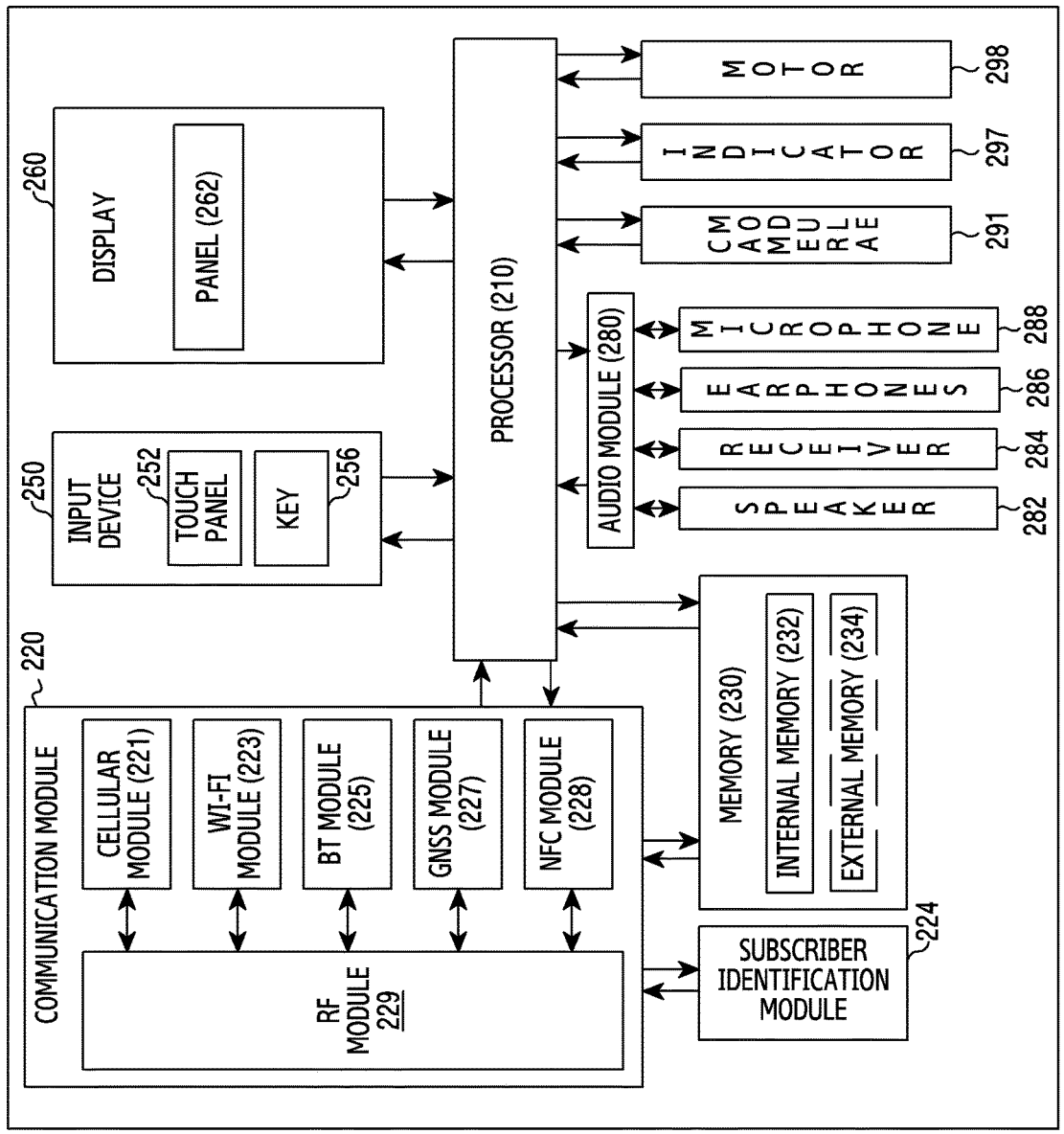
FIG. 2 illustrates a block diagram of an electronic device according to various embodiments of the disclosure.

FIG. 2 illustrates a block diagram of an electronic device 201 according to various embodiments of the disclosure. The electronic device 201 may include, for example, all or part of the electronic device 101 illustrated in FIG. 1. The electronic device 201 may include one or more processors (e.g., AP) 210, a communication module 220, a subscriber identification module 224, a memory 230, an input device 250, a display 260, an audio module 280, a camera module 291, an indicator 297, and a motor 298. The processor 210, for example, can control a plurality of hardware or software components connected to the processor 210 by executing an OS or an application program, and process various data and operations. The processor 210 can be implemented with, for example, a System on Chip (SoC). According to one embodiment, the processor 210 can further include a Graphic Processing Unit (GPU) and/or an image signal processor. The processor 210 may include at least part (e.g., a cellular module 221) of the components shown in FIG. 2. The processor 210 can load and process commands or data received from at least one of the other components (e.g., nonvolatile memory) into a volatile memory, and store various data in the nonvolatile memory.

The communication module 220 can have the same or similar configuration to the communication interface 170 of FIG. 1. The communication module 220 can include, for example, a cellular module 221, a WiFi module 223, a Bluetooth (BT) module 225, a GNSS module 227 (e.g., a GPS module, a Glonass module, a Beidou module, or a Galileo module), a Near Field Communication (NFC) module 228, and a Radio Frequency (RF) module 229. The cellular module 221 can provide, for example, voice call, video call, text service, or Internet service through a communication network. According to one embodiment, the cellular module 221 can identify and authenticate the electronic device 201 in the communication network by using the SIM 224 (e.g., a SIM card). The cellular module 221 can perform at least part of a function which can be provided from the processor 210. The cellular module 221 can further include a CP. According to an embodiment, at least some (e.g., two or more) of the cellular module 221, the WiFi module 223, the BT module 225, the GNSS module 227, or the NFC module 228 can be included in one Integrated Chip (IC) or an IC package. The RF module 229 can, for example, transmit and receive communication signals (e.g., RF signals). The RF module 229 can include, for example, a transceiver, a Power Amp Module (PAM), a frequency filter, a Low Noise Amplifier (LNA), or an antenna. According to another embodiment, at least one of the cellular module 221, the WiFi module 223, the BT module 225, the GNSS module 227, or the NFC module 228 can transmit and receive RF signals through a separate RF module. The SIM 224 can include, for example, a card including a SIM and/or an embedded SIM, and contain unique identification information (e.g., an Integrated Circuit Card Identifier (ICCID)) or subscriber information (e.g., an International Mobile Subscriber Identity (IMSI)).

The memory 230 (e.g., the memory 130) can include, for example, an internal memory 232 or an external memory 234. The internal memory 232 can include at least one of, for example, a volatile memory (e.g., Dynamic Random Access Memory (DRAM), Static RAM (SRAM), or Synchronous Dynamic RAM (SDRAM)), and a non-volatile memory (e.g., One Time Programmable Read Only Memory (OTPROM), Programmable ROM (PROM), Erasable and Programmable ROM (EPROM), Electrically Erasable and Programmable ROM (EEPROM), mask ROM, flash ROM, flash memory (e.g., NAND flash or NOR flash), hard drive, or Solid State Drive (SSD)). The external memory 234 can further include a flash drive, for example, Compact Flash (CF), Secure Digital (SD), micro SD, mini SD, extreme digital (xD), multi-media card (MMC) or memory stick. The external memory 234 can be functionally and/or physically connected to the electronic device 201 through various interfaces.

The input device 250 may include, for example, a touch panel 252 and/or a key 256. The touch panel 252 may employ, for example, at least one of a capacitive scheme, a resistive scheme, an infrared scheme, and an ultrasonic scheme. Furthermore, the touch panel 252 may further include a control circuit. The touch panel 252 may further include a tactile layer to provide a tactile reaction to a user. The key 256 may include, for example, a physical button, an optical key, or a keypad.

The display 260 (e.g., the display 160) may include a control circuit for controlling a panel 262. The panel 262 may be implemented to be, for example, flexible, transparent, or wearable. The panel 262, together with the touch panel 252, may be configured as one or more modules. According to an embodiment, the panel 262 may include a pressure sensor (or a POS sensor) which may measure the strength of pressure of a user's touch. The pressure sensor may be implemented integrally with the touch panel 252 or as one or more sensors separate from the touch panel 252.

The audio module 280 may convert, for example, sound into an electrical signal, and vice versa. At least some elements of the audio module 280 may be included, for example, in the input/output interface 145 illustrated in FIG.

1. The audio module 280 may process sound information that is input or output through, for example, a speaker 282, a receiver 284, an earphone 286, the microphone 288, and the like. The camera module 291 is a device that can photograph a still image and a moving image. According to an embodiment, the camera module 291 may include one or more image sensors (for example, a front sensor or a rear sensor), a lens, an image signal processor (ISP), or a flash (for example, an LED or xenon lamp).

The indicator 297 may display a particular state, for example, a booting state, a message state, a charging state, or the like of the electronic device 201 or a part of the electronic device 201 (for example, the processor 210). The motor 298 may convert an electrical signal into a mechanical vibration and may generate a vibration, a haptic effect, or the like. The electronic device 201 may include a mobile TV support device (e.g., GPU) that can process media data according to a standard, such as digital multimedia broadcasting (DMB), digital video broadcasting (DVB), mediaFlo™, and the like. Each of the above-described component elements of hardware according to the disclosure may include one or more elements, and the names of the corresponding elements may change based on the type of electronic device. In various embodiments, an electronic device (for example, the electronic device 201) may omit some elements or may further include additional elements, or some of the elements of the electronic device may be combined with one another to configure a single entity, in which case the electronic device may perform the functions of the corresponding elements in a manner identical to that prior to the combination.

Hereinafter, various embodiments are described in which user information is acquired in a device-to-device (D2D)-based off-network mission-critical push-to-talk (MCPTT) system. The definitions of terms used in the foregoing description are as follows.

The 'utterer' may be an electronic device which has the floor in a group. The utterer may perform an operation of transmitting, to other electronic devices, an utterance made by a user of the electronic device. For example, the utterer may refer to an electronic device capable of transmitting media to other electronic devices in a group by performing transmission of a floor request message and a floor acquisition message. An utterer in an off-network MCPTT service according to various embodiments may be one in a group, and the other electronic devices may perform only reception of media information. Hereinafter, an utterer according to various embodiments of the disclosure may be expressed using another term having equivalent technical meaning, such as a speaker, a speaker who has the floor, a media transmitter, and the like.

The "floor arbitrator" may be an electronic device that performs an operation of managing the configuration of utterances of a plurality of electronic devices in a group. For example, in the off-network MCPTT service, the floor arbitrator may be the same electronic device as the electronic device that has the floor. According to the technical characteristics of the off-network MCPTT service, the floor arbitrator may be an electronic device that performs a server role in place of an on-network MCPTT service. For example, the floor arbitrator may receive a floor queue position request message from another electronic device, and may be an electronic device for transmitting a response message including floor queue information.

The "anonymous utterance" may refer to media rendering having no utterer information. For example, in the disaster safety network standard, an electronic device that does not receive a floor acquisition message may receive media information and reproduce the received media. In this case, the utterer information cannot be known, because the floor acquisition message including the utterer's ID information has not been received in advance. Accordingly, the anonymous utterance may include the case in which media information is received and rendered without receiving a floor acquisition message including the utterer's information.

A "group" may mean a set to which a user belongs. Group management information may include information, such as a group ID, floor priorities of users within the group, and an address for multicast communication among users in the group. In the case of off-network MCPTT, the group information may be obtained when access to a MCPTT configuration server can be established, and when switched to an off-network, the group information may not be modified.

A "user identification (ID)" is a unique value assigned to a user by the MCPTT configuration server, and may be included in the floor control message and then transmitted. The user ID may be information included in user information. For example, when the anonymous utterance has occurred, the user ID for the floor arbitrator may be included in the floor control message and then transmitted or received, thereby reducing the incidence of anonymous utterances.

"Media information" may refer to information on the utterance transmitted from an electronic device that has the floor to a plurality of electronic devices in a group. Specifically, the media information may be text, an image, audio, or video, but is not limited thereto. The media information may be in various formats that may include information on the utterance.

Figure 3:
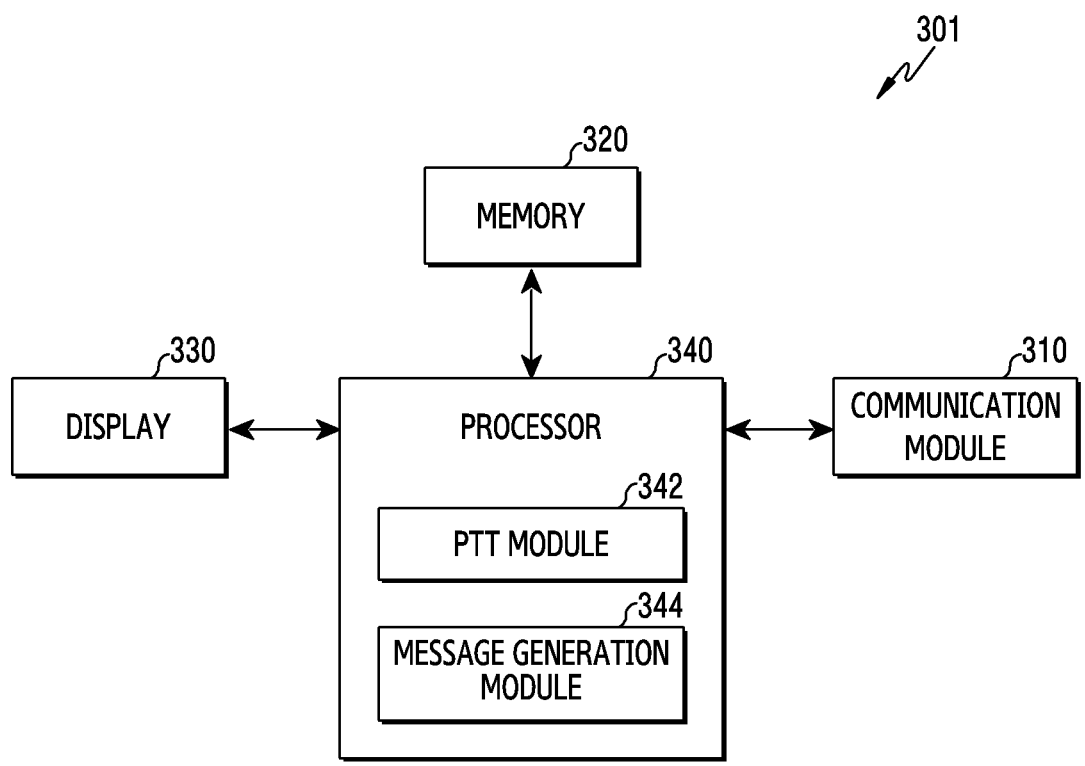
FIG. 3 illustrates the functional configuration of an electronic device according to various embodiments of the disclosure.

FIG. 3 illustrates the functional configuration of an electronic device according to various embodiments of the disclosure. FIG. 3 illustrates an example of the configuration of an electronic device 301 (e.g., the electronic device 101 or other electronic devices 102 and 103 in FIG. 1, and the electronic device 201 of FIG. 2). The configuration shown in FIG. 3 may be understood as the configuration of the electronic device 101 or other electronic devices 102 and 103.

Referring to FIG. 3, the electronic device 101 or other electronic devices 102 and 103 may include a communication module 310, a memory 320, a display 330, and a processor 340.

According to an embodiment of the disclosure, the communication module 310 may perform functions for performing communication with another device. The communication module 310 may provide an interface for performing communication by the electronic device 101 or other electronic devices 102 and 103 through a wired channel or a wireless channel. For example, the communication module 310 may transform data and physical signals. According to an embodiment, the communication module 310 may receive media information about the utterance. In addition, the communication module 310 may transmit or receive the floor control message for controlling the floor in a group (e.g., a floor request message, a floor acquisition message, a floor release message, a floor grantee information request message, a floor grantee information response message, and an update complete message). The communication module 310 may be an element corresponding to the communication interface 170 of FIG. 1 or the communication module 220 of FIG. 2.

According to an embodiment of the disclosure, the memory 320 may store a basic program, an application program, and data such as configuration information for the operation of the electronic device 101 or the other electronic devices 102 and 103. According to an embodiment, the memory 320 may store a user ID of an electronic device for performing the function of the floor arbitrator, the user ID being included in the floor acquisition message. In addition, the memory 320 may store user IDs of other electronic devices existing in the group. The storage unit 320 may be configured as a volatile memory, a non-volatile memory, or a combination of a volatile memory and a non-volatile memory. In addition, the memory 320 may provide stored data at the request of the processor 340. The memory 320 may be an element corresponding to the memory 130 of FIG. 1 or the memory 230 of FIG. 2.

According to an embodiment of the disclosure, the display 330 may be an element for screen display of the electronic device 101. For example, the display 330 may receive media information of another electronic device from the processor 340, and may render the media information. According to various embodiments, the media may be text, video, or anything else that can be visually expressed. For example, the display 330 may include at least one of an organic light emitting device (OLED), a quantum-dot light emitting diode (QLED), and a liquid crystal display (LCD). The display 330 may be an element corresponding to the display 160 of FIG. 1 or the display 260 of FIG. 2.

According to an embodiment of the disclosure, the processor 340 may control the overall operation of the electronic device 101 or other electronic devices 102 and 103. For example, the processor 340 may control the screen display through the display 330 by rendering media information received from another electronic device. As another example, the processor 340 may transmit or receive various floor control messages through the communication module 310. The processor 340 may read or write data from or to the memory 320, and may execute an application, code, or the like stored in the memory 320. For example, the processor 340 may control the electronic device 101 or the other electronic devices 102 and 103 to perform an operation according to various embodiments described below. For example, the processor 340 may compare pieces of synchronization source information so as to determine whether the electronic device that is transmitting the media being reproduced, and the electronic device that is transmitting a response message (e.g., a floor queue position response message or a floor grantee information response message) are the same electronic device. In addition, the processor 340 may perform control such that the media information received from another electronic device is displayed through the display 330. The processor 340 may be an element corresponding to the processor 120 of FIG. 1 or the processor 210 of FIG. 2. The processor 340 according to various embodiments of the disclosure may include a PTT module 342 and a message generation module 344.

The PTT module 342 according to an embodiment of the disclosure may control overall operations for providing a PTT service. For example, the PTT module 342 may block the transmission of media information when a floor acquisition message is received. Alternatively, the PTT module 342 may be configured to transmit the floor request message instead of the media information when input for transmission of the media information by a user is detected. According to an embodiment, the electronic device 101 may detect input for transmission of the floor request message by detecting a touch of a button displayed on a user interface or a user application. When input for transmission of media information is detected, the PTT module 342 may determine whether the user has the floor. When it is determined that the user has the floor, the PTT module 342 may be configured to transmit the media information according to the input for transmission of the media information. When it is determined that the user does not have the floor, the PTT module 342 may be configured to block transmission of the media information despite the user's input for transmission of the media information, and to transmit the floor request message instead of the media information. Detection of the input for transmission of the floor request message according to an embodiment is not limited thereto, and the detection may be possible via a hardware button existing in the electronic device 101 and various other interface environments. As an example, the electronic device 101 may display a dial button (not shown) through the display 330. The display 330 may be configured as a touch screen display capable of detecting touch input. When a user touches the dial button, the electronic device 101 may detect a touch input, and accordingly, operate to transmit the floor request message to other electronic devices. In another example, buttons other than a dial button may be added. Other buttons may include a media transmission button, a video recording button, a sound recording button, and the like. In addition, the PTT module 342 may transmit the floor request message, and if there is no response for a designated time, transmit a floor acquisition message, display a user notification notifying of the acquisition of the floor, and induce the utterance. In one embodiment, the PTT module 342 may display a dial button (not shown) during a user's utterance. In this case, when touch input on a dial button is detected during the user's utterance, the PTT module 342 may perform an operation for ending the utterance.

A message generation module 344 according to an embodiment of the disclosure may generate a message for the MCPTT service. For example, upon receiving input of an utterance request from a user, the message generation module 344 may generate a floor request message. If it is determined that no other utterance request has been made for a designated time after transmission of the floor request message, the message generation module 344 may generate a floor acquisition message. In another example, upon receiving a floor queue position request message, the message generation module 344 may generate a floor queue position information message. In this case, the message generation module 344 may generate the floor queue position information message such that information, such as a priority of the utterance, a user ID of an electronic device for performing a function of a floor arbitrator, and the like are included therein.

According to various embodiments of the disclosure, an electronic device for acquisition of user information may be provided. The electronic device may include a communication module, a display, at least one processor electrically connected to the communication module and the display, and a memory electrically connected to the processor. The memory, when executed, may cause the processor to receive media information that does not include utterer information, perform signaling for acquisition of utterer information relating to the media information, and determine and display the utterer information.

According to various embodiments of the disclosure, for the signaling, the processor may transmit a floor queue position request message, receive a floor queue position response message, and obtain synchronization source information from the floor queue position response message.

According to various embodiments of the disclosure, for the determination and display, the processor may compare first synchronization source information of a floor queue position response message and second synchronization source information of the media information.

According to various embodiments of the disclosure, when the first synchronization source information and the second synchronization source information coincide with each other, the processor may update anonymous utterer information with user information of the floor arbitrator, the user information being included in the floor queue position response message, and when the first synchronization source information and the second synchronization source information do not coincide with each other, the processor may perform again the signaling for acquisition of the utterer information.

According to various embodiments of the disclosure, for the performing of the signaling again, the processor may: determine whether a number of times of retry exceeds a pre-configured number of times of retry; when the number of times of retry has exceeded the pre-configured number of times of retry, maintain the anonymous utterer information; and when the number of times of retry does not exceed the pre-configured number of times of retry, transmit a floor queue position information request message.

According to various embodiments of the disclosure, for the signaling, the processor may transmit a floor grantee information request message, receive a floor grantee information response message, and obtain first synchronization source information. The floor grantee information response message may include user information of the floor arbitrator that is transmitting the media information and the first synchronization source information.

According to various embodiments of the disclosure, for the determination and display, the processor may compare the first synchronization source information of a floor grantee information response message and the second synchronization source information of the media information.

According to various embodiments of the disclosure, the processor may further transmit an update complete message for the utterer information.

According to various embodiments of the disclosure, the processor may: receive the floor grantee information request message; in response to reception of the floor grantee information request message, determine whether to receive a floor grantee information response message; determine whether the floor grantee information response message is received within a standby time; and when the floor grantee information response message is not received within the standby time, transmit the floor grantee information response message.

According to various embodiments of the disclosure, when the floor grantee information response message is received within a standby time, the processor may cancel transmission standby of the response message.

Figure 4:
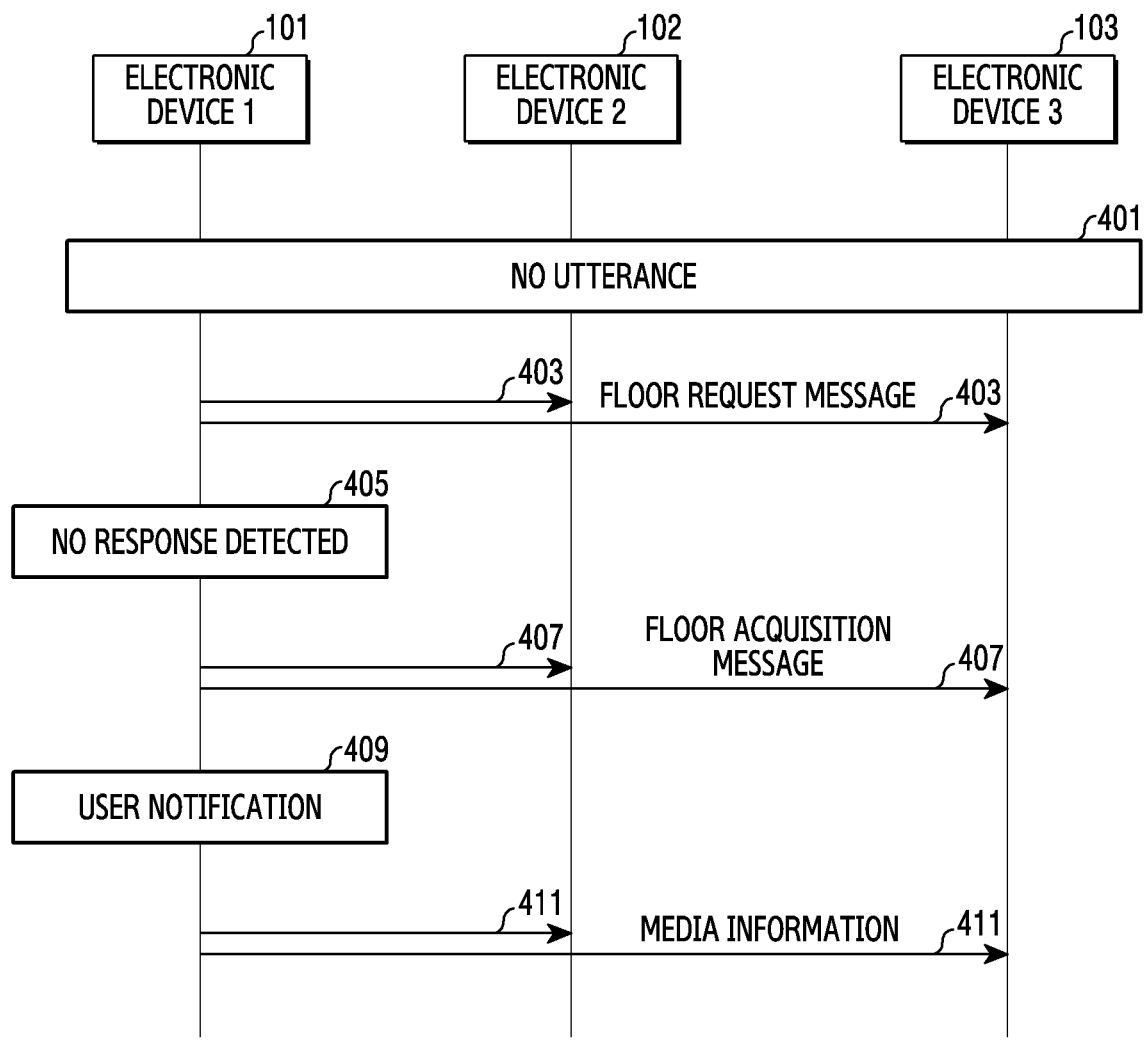
FIG. 4 is a signal exchange diagram illustrating acquisition of the floor according to various embodiments of the disclosure.

FIG. 4 illustrates a signal exchange diagram for acquisition of the floor according to various embodiments of the disclosure. FIG. 4 illustrates an operation method of the electronic device 101 (e.g., the processor 120).

Referring to FIG. 4, in operation 401, the electronic device 101 or the other electronic devices 102 and 103 according to various embodiments may identify that no utterance is currently occurring. For example, the electronic device 101 may join a group including other electronic devices 102 and 103, and may stand by for a predetermined period of time. If media information, a floor request message, or a floor acquisition message is not received for a predetermined time, the electronic device 101 may determine that there is no current utterance.

In operation 403, the electronic device 101 according to various embodiments may transmit a floor request message. For example, the electronic device 101 may transmit the floor request message to each of the electronic devices 102 and 103 included in the group. The floor request message may be a message for an electronic device which acquires the floor in a group which the electronic device joins, and performs a function of a floor arbitrator. For example, the electronic device 101 may include the floor request message in which priority information of the electronic device 101 and a random value generated before performing transmission are included. According to various embodiments, the priority information may mean information for determination of the utterance ranking among a plurality of users. Specifically, when each user simultaneously requests the floor, by comparing pieces of priority information, a user having a higher priority may first acquire the floor. In addition, when each user who has the same priority simultaneously requests the floor, each user may determine an electronic device which performs the function of a floor arbitrator through comparison of random values having been generated before performing transmission. According to various embodiments, for transmission by the electronic device 101, a scheme of multicasting to a designated electronic device (e.g., other electronic devices in a group) may be used. According to various embodiments, when an input for a user utterance is detected, the electronic device 101 may perform transmission of all electronic devices in a group. In detail, the electronic device 101 may detect a touch input of a dial button (not shown) for an utterance request, and may transmit media information including information about the user utterance to other electronic devices in the group. In another example, when the electronic device 101 is an electronic device that performs the function of the floor arbitrator after a predetermined time point according to the priority of the floor, the electronic device 101 may transmit media information about the user utterance to other electronic devices in the group after the corresponding time point.

In operation 405, the electronic device 101 according to various embodiments may detect no response. For example, the electronic device 101 may stand by for a designated predetermined time in order to identify whether another floor requester exists. The electronic device 101 may identify whether a floor request message is received from the other electronic devices 102 and 103 for a predetermined time. For example, when a floor request message is not received for a predetermined time, the electronic device 101 may determine that there is no other floor requester.

In operation 407, the electronic device 101 according to various embodiments may transmit a floor acquisition message. The floor acquisition message may be a message notifying other electronic devices 102 and 103 in a group that the electronic device 101 has acquired the floor. The electronic device 101 may add a user ID to the floor acquisition message and transmit the same, and the other electronic devices 102 and 103, having received the floor acquisition message, may acquire a user ID of an electronic device that has currently acquired the floor. The electronic device that transmitted the floor acquisition message may be an electronic device that performs the function of a floor arbitrator having the floor in the group. According to various embodiments, an electronic device that performs the function of a floor arbitrator may play the role of a server in long term evolution (LTE)-based MCPTT. For example, the electronic device 101 may process a floor control message which is received from other electronic devices 102 and 103 during the utterance. For example, when the electronic device 101 that performs the function of the floor arbitrator receives a floor queue position request message from another electronic device, the electronic device 101 may transmit a response message including information on the standby sequence of the utterance.

In operation 409, the electronic device 101 according to various embodiments may provide a user notification. For example, the electronic device 101 may notify the user that the electronic device has acquired the floor, through at least one of visual notification (for example, a pop-up message, an icon, etc.), auditory notification (for example, sound effect output), or tactile notification (for example, vibration). Visual notification according to an embodiment may be displayed through the display 260 of the electronic device. Auditory notification according to an embodiment may be provided as a sound effect or voice guidance through the speaker 282. Tactile notification according to an embodiment may be provided through haptic vibration using the indicator 297, and the strength of vibration and the number of times of vibration may be configured according to a predetermined value or a value configured by a user. Accordingly, the user of the electronic device 101 can start transmission of the media information so as to make an utterance.

In operation 411, the electronic device 101 according to various embodiments may transmit media information. For example, because the electronic device 101 has acquired the floor in a group, the electronic device 101 may make an utterance through transmission of media information. That is, the utterance made by the user of the electronic device 101 may have various forms, such as voice, video, text, and an image, and the media information may include information on the corresponding utterance. According to various embodiments, the media information may be transmitted through a real-time transmission protocol, and may include text, an image, audio, video, and the like, but is not limited thereto.

Figure 5:
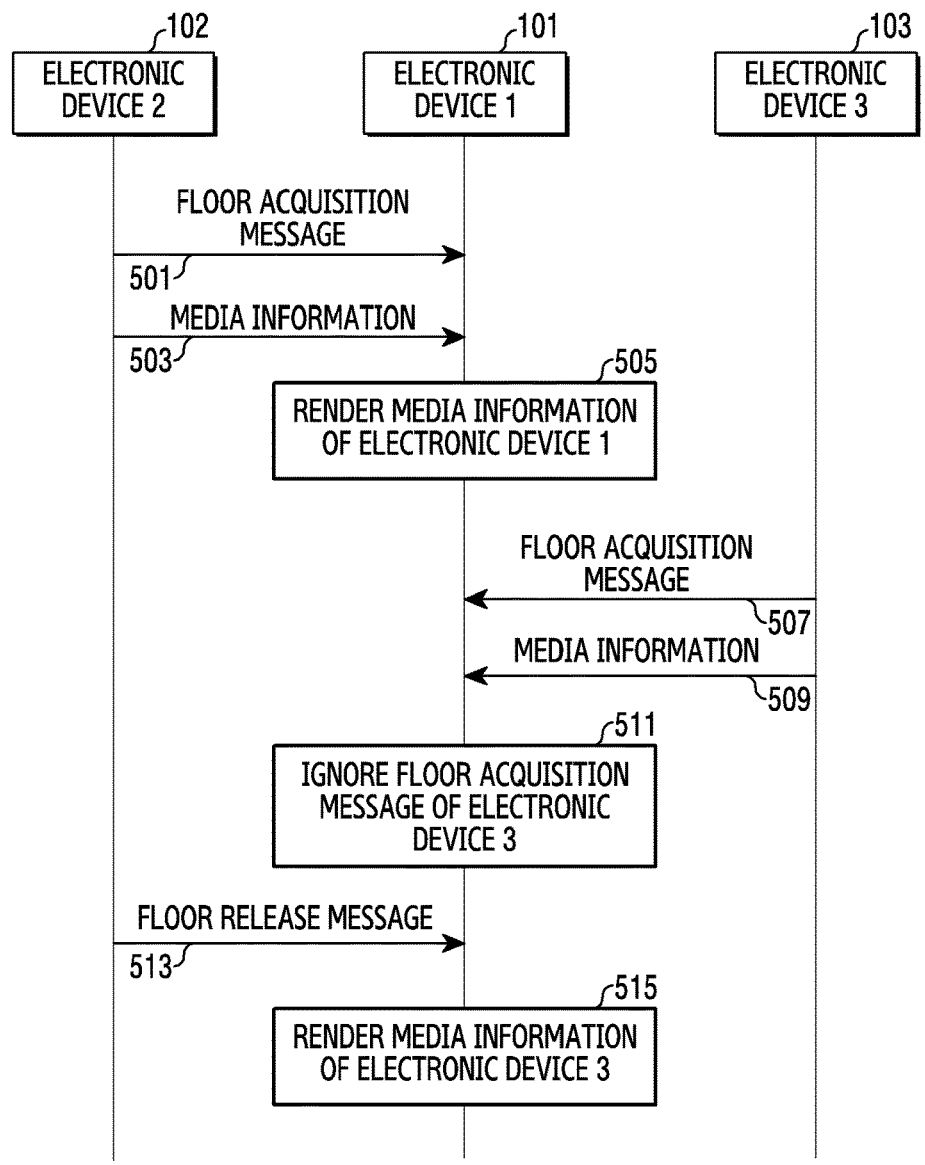
FIG. 5 illustrates an example of occurrence of multiple utterers according to various embodiments of the disclosure.
Figure 5:
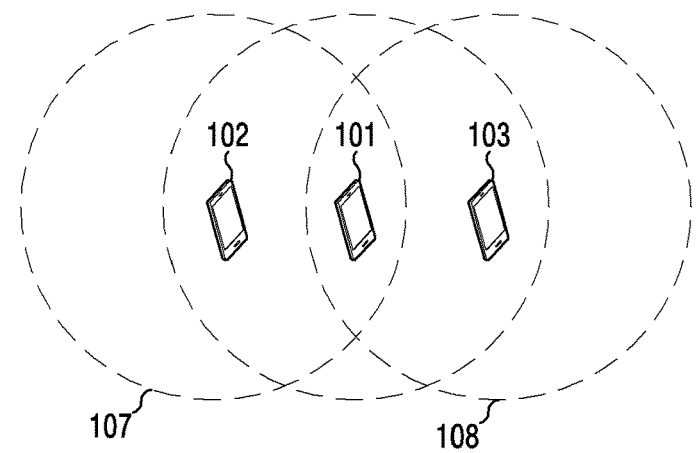

FIG. 5 illustrates an example of anonymous utterance made by multiple utterers according to various embodiments of the disclosure. FIG. 5 illustrates an operation method of the first electronic device 101 (e.g., the processor 120).

Referring to FIG. 5, in operation 501 according to various embodiments, a first electronic device 101 may receive a floor acquisition message from a second electronic device 102. For example, the first electronic device 101 may recognize that the electronic device of the current utterer is the second electronic device 102, by means of user ID information included in the floor acquisition message received from the second electronic device 102 in the same group. In an embodiment, the electronic device 103 is not included in the communication range 107 of the second electronic device 102, and thus may not receive the floor acquisition message.

In operation 503, the first electronic device 101 according to various embodiments may receive media information transmitted by the second electronic device 102. The second electronic device 102 has acquired the floor in a group by transmitting the floor acquisition message, and may transmit media information to the first electronic device 101. The media information according to various embodiments may be information about the utterance made by the user of the second electronic device 102. For example, the media information may be information, such as a video and a voice recorded by the user of the second electronic device 102. The media information according to an embodiment may be text, audio, or video, but is not limited thereto. Various other media may be transmitted, and may be implemented through a real-time transmission protocol.

In operation 505, the first electronic device 101 according to various embodiments may render media information received from the second electronic device 102. The first electronic device 101 may store utterer information (e.g., the second electronic device 102) in the floor acquisition message received before reception of the media information, and may render the media information together with the utterer information. For example, in the case of media information about the recorded voice, the first electronic device 101 may output voice through the speaker 282, and in the case of media information about the recorded video, the first electronic device 101 may output a sound and a video through the speaker and the display 260.

In operation 507, the first electronic device 101 according to various embodiments may receive the floor acquisition message from the electronic device 103. Since the electronic device 103 is not located within the communication range 107 of the second electronic device 102, the electronic device 103 may not receive the floor acquisition message from the second electronic device 102. The electronic device 103 may determine that there is no utterance requester in the current group, and may transmit the floor acquisition message. Accordingly, the first electronic device 101 may be included in the communication range of the electronic device 103, and may thus receive the floor acquisition message from the electronic device 103.

In operation 509, the first electronic device 101 according to various embodiments may be included in the communication range 108 of the electronic device 103. Accordingly, the first electronic device 101 may receive media information multicast from the electronic device 103.

In operation 511, the first electronic device 101 according to various embodiments may ignore the floor acquisition message received from the electronic device 103. For example, even when there is an electronic device that performs the function of a floor arbitrator who has acquired the floor in advance, and if the first electronic device 101 receives the floor acquisition message from another electronic device, the first electronic device 101 may treat the message as an error and ignore the same because the message corresponds to a message transmitted from another device, rather than the electronic device performing the function of the floor arbitrator.

In operation 513, the first electronic device 101 according to various embodiments may receive a floor release message transmitted by the second electronic device 102. The floor release message according to various embodiments may be a message indicating that the utterance according to the media transmission has ended. The floor release message may be multicast to electronic devices in a group. When the first electronic device 101 receives the floor release message from the second electronic device 102, the first electronic device 101 may recognize that the utterance made by the second electronic device 102 has ended. Therefore, the first electronic device 101 may end media rendering of the second electronic device 102.

In operation 515, the first electronic device 101 according to various embodiments may render media information transmitted from the electronic device 103. In operation 517, the electronic device 103 may determine that the floor has been acquired through transmission of the floor acquisition message, and may proceed with media transmission according thereto. In this case, since the first electronic device 101 has ignored the floor acquisition message in operation 521, the first electronic device 101 may receive media information from the electronic device 103 in the state of not having received the floor acquisition message of the electronic device 103. Accordingly, the first electronic device 101 may determine that an anonymous utterance is detected, and may render media information of an anonymous utterer.

As described above with reference to FIG. 5, when the floor acquisition message is received from another electronic device while performing media rendering according to a limited communication range, the electronic device 101 may fail to acquire utterer information, and an anonymous utterance may occur. Hereinafter, when the anonymous utterance occurs, embodiments for updating utterer information will be described with reference to FIGS. 6 to 11.

Figure 6:
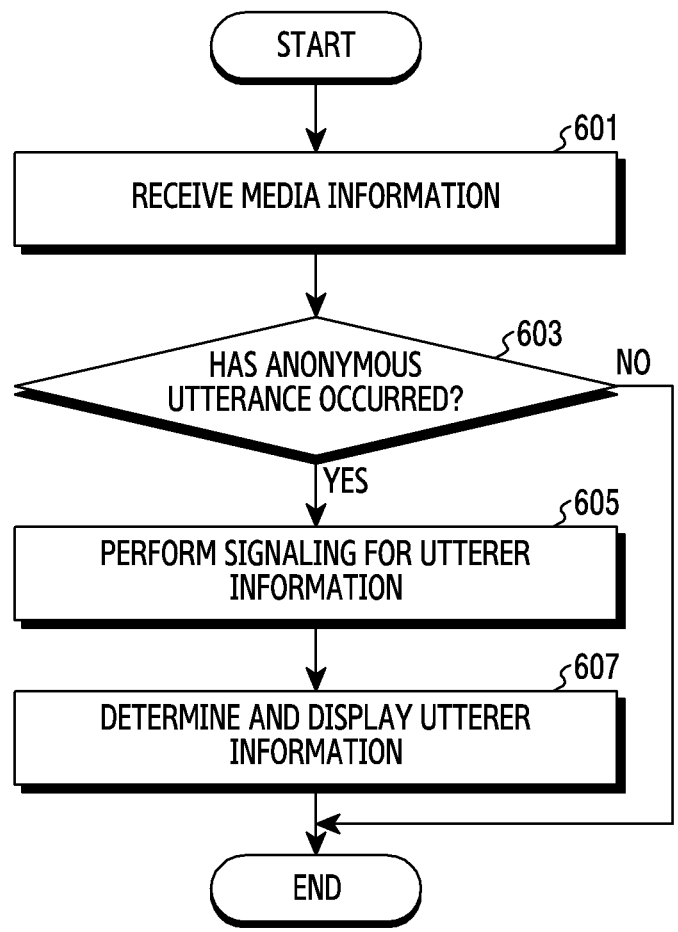
FIG. 6 is a flowchart illustrating acquisition of utterer information according to various embodiments of the disclosure.

FIG. 6 is a flowchart illustrating acquisition of utterer information according to various embodiments of the disclosure. FIG. 6 illustrates an operation method of the first electronic device 101 (e.g., the processor 120).

In operation 601, the first electronic device 101 according to various embodiments may receive media information. The media information according to various embodiments may be transmitted from the electronic device of the user who currently has the floor, and may include information about the utterance. According to various embodiments, operation 601 may correspond to operation 411 of FIG. 4, operation 503 of FIG. 5A, and operations 513 and 519 of FIG. 5B.

In operation 603, the first electronic device 101 according to various embodiments may determine whether the anonymous utterance occurs. For example, upon receiving media information, the first electronic device 101 may identify whether the floor acquisition message has been received. According to various embodiments, when the first electronic device 101 participates too late in a group to receive the floor acquisition message from another electronic device having the floor in the group, the first electronic device 101 may fail to acquire the utterer information. In addition, when the floor acquisition message is received from another electronic device while rendering the media information, the first electronic device 101 may ignore the corresponding message, and may fail to acquire the utterer information. In addition, the first electronic device 101 may fail to acquire the utterer information according to packet loss relating to the floor acquisition message. Therefore, if the first electronic device 101 fails to receive the floor acquisition message before receiving the media information, the first electronic device 101 may determine that an anonymous utterance has occurred.

If it is determined that the anonymous utterance has not occurred, the first electronic device 101 may identify the utterer information and render the media information together with the corresponding utterer information.

In operation 605, when it is determined that an anonymous utterance has occurred, the first electronic device 101 according to various embodiments may perform signaling for the acquisition of utterer information. The first electronic device 101 may use a message defined in the standard specification or a newly defined message in order to update the utterer information. According to various embodiments, signaling for acquisition of utterer information may be a multicasting scheme performed for all electronic devices in the same group.

In operation 607, the first electronic device 101 according to various embodiments may determine and display utterer information. In an example, the first electronic device 101 may determine whether specific information of the received media (e.g., second synchronization source information) and specific information of a message (e.g., first synchronization source information) acquired through signaling for acquisition of utterer information coincide with each other. Accordingly, when it is determined that the received media-specific information and message-specific information coincide with each other, the first electronic device 101 may update the utterer information using a user ID included in a message acquired through signaling, and may display the updated utterer information through the display 330.

Figure 7A:
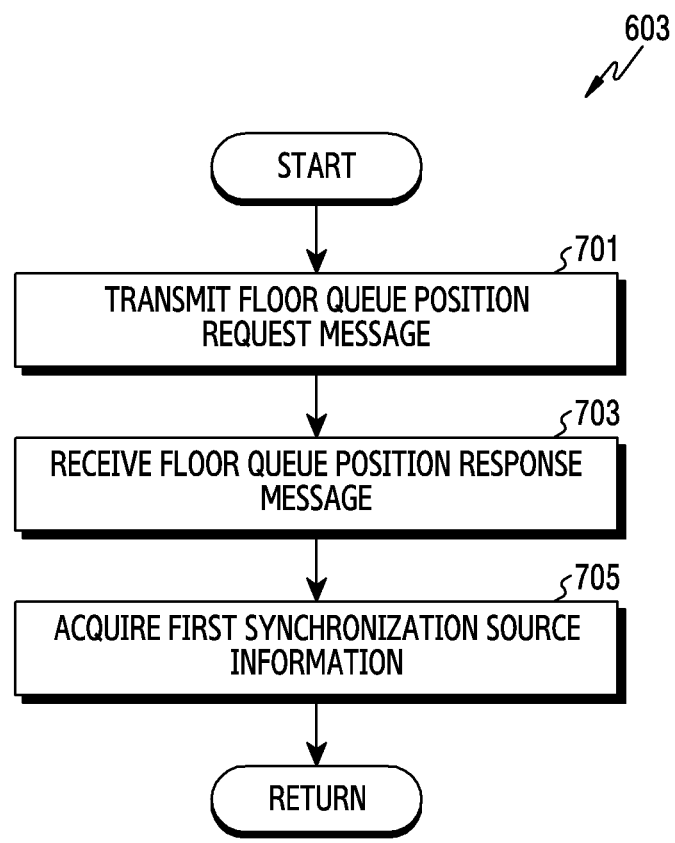
FIG. 7A illustrates a signaling flowchart for utterer information based on a standard specification according to various embodiments of the disclosure.

FIG. 7A is a flowchart illustrating a signaling operation for acquisition of utterer information based on the standard specification according to various embodiments of the disclosure. FIG. 7A illustrates an operation method of the first electronic device 101 (e.g., the processor 120). FIG. 7A illustrates a detailed flowchart of operation 603.

Referring to FIG. 7A, in operation 701, the first electronic device 101 according to various embodiments may transmit a floor queue position request message. For example, upon detecting that anonymous utterance has occurred, the first electronic device 101 may transmit the message to acquire utterer information. According to various embodiments, the floor queue position request message may be a message defined to determine the standby sequence of the utterance in a standby state. The floor queue position request message may include a user ID, synchronization source information, and the like of an electronic device that performs the function of a floor arbitrator. The floor queue position request message may be included in the floor queue control message, and may be transmitted to all electronic devices in the same group in a multicast scheme. Therefore, users of all electronic devices belonging to the same group may receive the floor queue position request message.

In operation 703, the first electronic device 101 according to various embodiments may receive a floor queue position response message. For example, the first electronic device 101 may transmit a floor queue position request message, and may stand by for reception of the floor queue position request response message for a predefined period of time T. The predefined period of time T according to various embodiments may be defined in consideration of a communication delay time. For example, the predefined period of time T may be variously defined based on information, such as numbers of electronic devices in the same group, a channel state between electronic devices, a remaining amount of a battery charge, and the like. In addition, the predefined period of time T may be defined by the user's configuration. According to the standard specification, the floor queue position response message may be a message transmitted from the electronic device that performs the function of a floor arbitrator, and may include a user ID. An electronic device that does not perform the function of the floor arbitrator may ignore the floor queue position request message. In an embodiment, when reception of the floor queue response message fails for a predefined period of time T, the first electronic device 101 may repeatedly transmit the floor queue position request message.

In operation 705, the first electronic device 101 according to various embodiments may obtain first synchronization source information. For example, the first electronic device 101 may receive the floor queue position response message from the electronic device that performs the function of the floor arbitrator before the predefined period of time T has elapsed. According to various embodiments, the floor queue position response message may include a user ID, synchronization source information (hereinafter, referred to as first synchronization source information), and the like of the electronic device that performs the function of the floor arbitrator as well as information on the standby sequence of the floor. The synchronization source information may be information for displaying a source for generating a real-time transport protocol packet. Accordingly, the first electronic device 101 may acquire first synchronization source information included in the floor queue position response message.

Figure 7B:
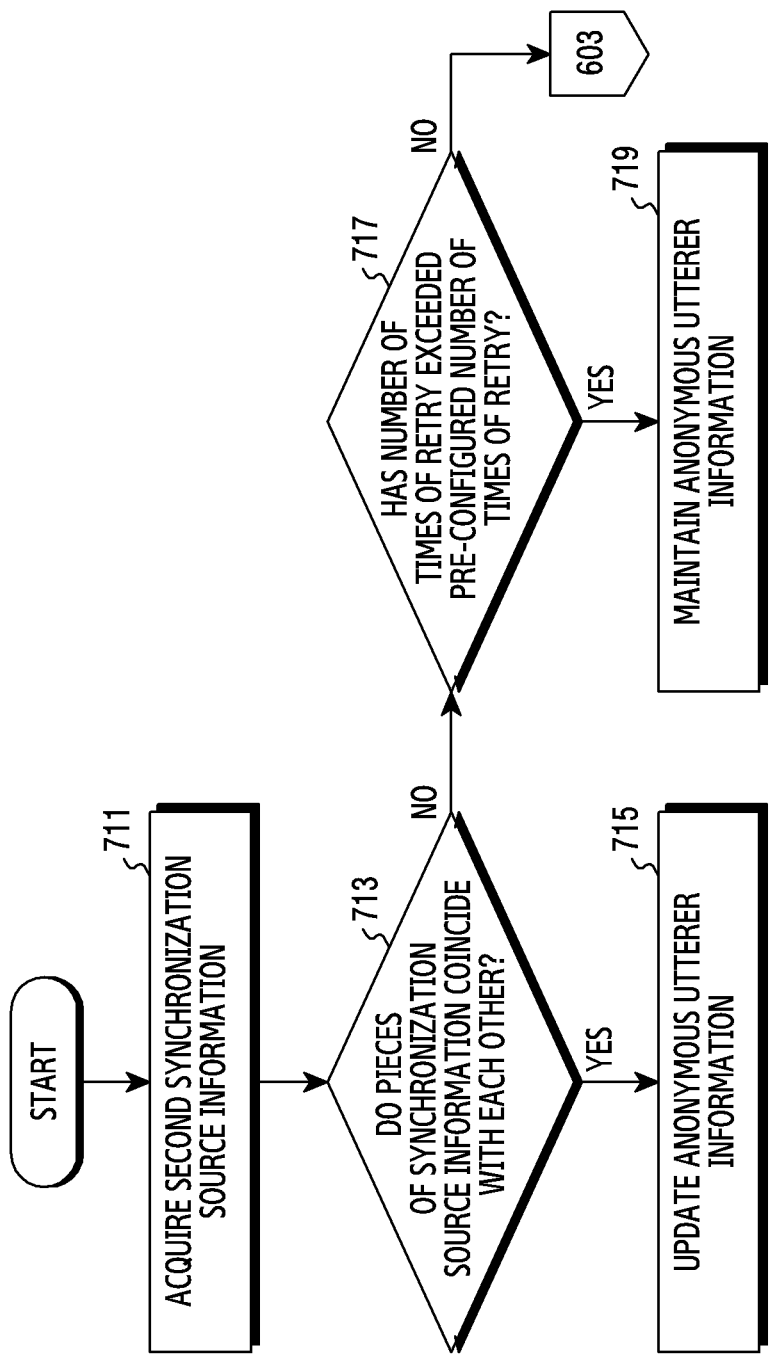
FIG. 7B illustrates a detailed flowchart for the determination and display of utterer information according to various embodiments of the disclosure.

FIG. 7B is a detailed flowchart illustrating the determination and display of utterer information according to various embodiments of the disclosure. FIG. 7B illustrates an operation method of the first electronic device 101 (e.g., the processor 120). FIG. 7B illustrates a detailed flowchart of operation 605.

Referring to FIG. 7B, in operation 711, the first electronic device 101 according to various embodiments may acquire second synchronization source information. Here, the second synchronization source information may be synchronization source information that can be acquired from media information, and may be information differentiated from the first synchronization source information included in the floor queue position request message. The first electronic device 101 may receive the media information through packets according to a real-time transmission protocol, and may acquire the second synchronization source information through the header of the packet.

In operation 713, the first electronic device 101 according to various embodiments may determine whether pieces of synchronization source information coincide with each other. For example, the first electronic device 101 may determine whether the first synchronization source information acquired from the floor queue position request message and the second synchronization source information acquired from the header of the media information coincide with each other. When the first synchronization source information and the second synchronization source information coincide with each other, the first electronic device 101 may determine that the electronic device currently transmitting the media information and the electronic device transmitting the floor queue position response message are the same electronic device. According to various embodiments, since the electronic device transmitting the floor queue position response message is the electronic device that performs the function of the floor arbitrator, the first electronic device 101 may recognize that media transmission is performed by the electronic device currently performing the function of the floor arbitrator. On the other hand, when the first synchronization source information and the second synchronization source information do not coincide with each other, the first electronic device 101 may recognize that the electronic device currently transmitting the media information differs from the electronic device transmitting the floor queue position response message.

In operation 715, when the first synchronization source information and the second synchronization source information coincide with each other, the first electronic device 101 according to various embodiments may update and display anonymous utterer information. For example, when the first synchronization source information and the second synchronization source information coincide with each other, the first electronic device 101 may identify the user ID of the electronic device that performs the function of the floor arbitrator, the user ID being included in the floor queue position response message received by the first electronic device 101. Accordingly, when it is determined that the first synchronization source information and the second synchronization source information coincide with each other, the first electronic device 101 may update the anonymous utterer information with the user ID information and display the same. Accordingly, anonymous utterances according to an embodiment of the disclosure can be reduced.

In operation 717, when the first synchronization source information and the second synchronization source information do not coincide with each other, the first electronic device 101 according to various embodiments may determine whether a number of times of retry for updating anonymous utterer information has exceeded a threshold. If the first synchronization source information and the second synchronization source information do not coincide with each other, the first electronic device 101 may identify that the anonymous utterer currently transmitting the media information is not the electronic device currently performing the function of the floor arbitrator, and may determine that update of the anonymous utterer information has failed. Thereafter, the first electronic device 101 may perform the above operation 701 again. According to an embodiment, in the case where the first electronic device 101 repeatedly attempts updating of the anonymous utterer information, there is a problem such as battery consumption, and thus it is required to limit the number of times of retry described above. Accordingly, the first electronic device 101 may determine whether a number of times of retry has exceeded the threshold whenever update of the anonymous utterer information has failed. According to various embodiments, the number of times of retry may be the number of times of retry determined by a user or a predetermined arbitrary number of times.

In operation 719, when the number of times of retry has exceeded the threshold, the first electronic device 101 according to various embodiments may maintain anonymous utterer information. For example, when it is determined that the number of times of retry due to the failure to update the anonymous utterer information has exceeded the threshold, the first electronic device 101 may not perform additional retries. Accordingly, the first electronic device 101 may process and maintain, as an anonymous utterer, the utterer information of the received media information.

If the number of times of retry does not exceed the threshold, the first electronic device 101 may return to operation 603 to perform signaling for acquisition of utterer information. For example, when it is determined that the number of times of retry due to the failure to update the anonymous utterer information does not exceed the threshold, the first electronic device 101 may not perform a retry procedure. The retry procedure may correspond to operation 603 described above.

Figure 8:
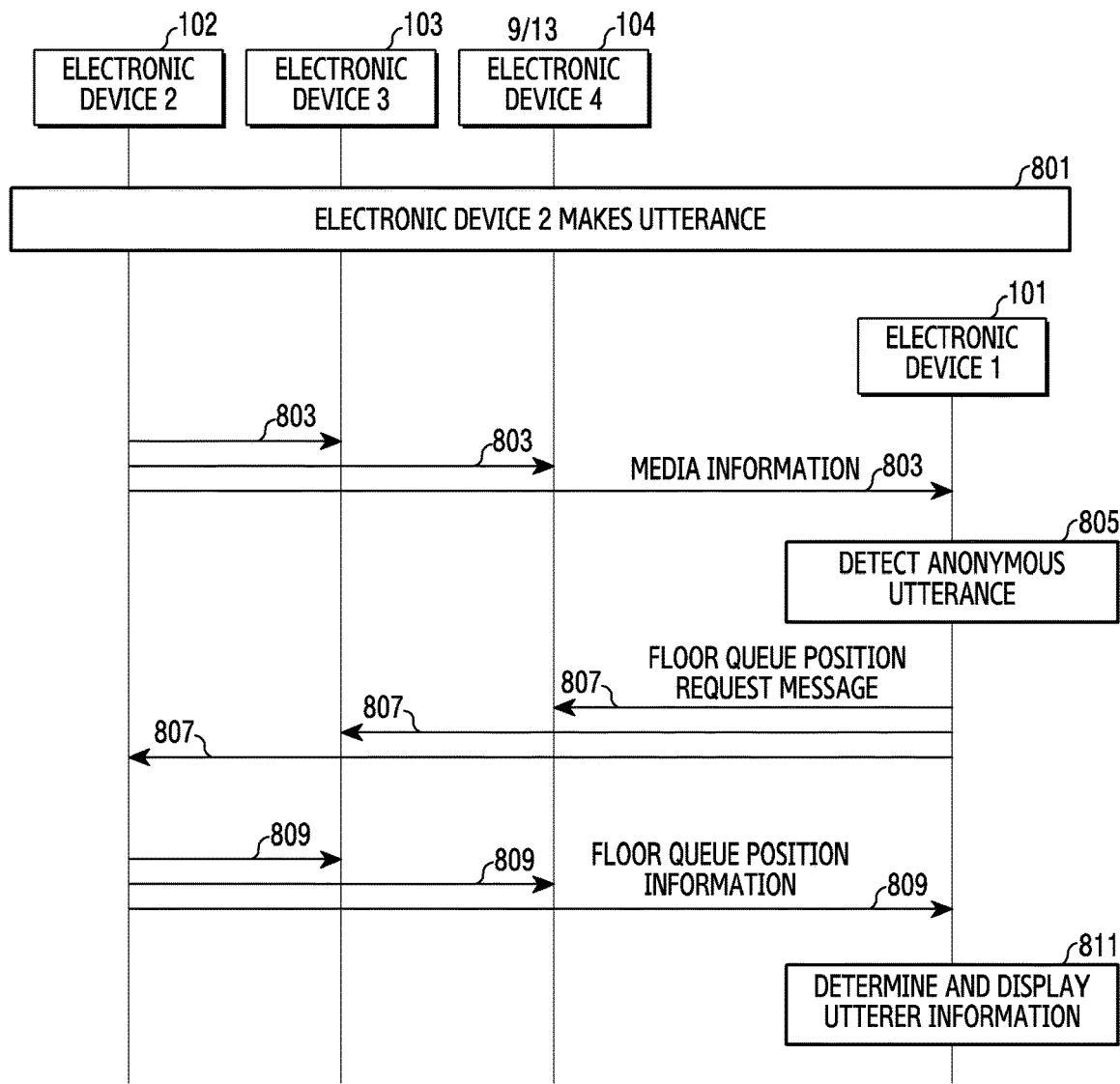
FIG. 8 is a signal exchange diagram illustrating acquisition of utterer information based on the standard specification according to various embodiments of the disclosure.
Figure 8:
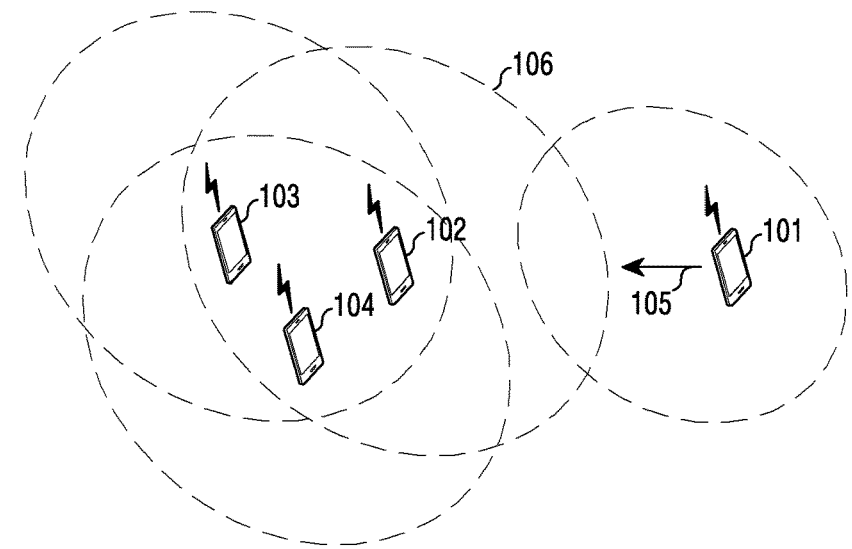

FIG. 8 is a signal exchange diagram illustrating acquisition of utterer information based on the standard specification according to various embodiments of the disclosure. FIG. 8 illustrates an operation method of the first electronic device 101 (e.g., the processor 120).

Referring to FIG. 8, in operation 801, the second electronic device 102 according to various embodiments may make an utterance. For example, the electronic devices 102 to 104 may configure the same group, and the above-described operations of FIG. 4 may be performed. For example, the second electronic device 102 may be an electronic device that acquires the floor through transmission of the floor request message and the floor acquisition message, and performs the function of a floor arbitrator. Therefore, the second electronic device 102 may make an utterance through transmission of media information. The first electronic device 101 may not belong to a group, and may not receive a floor acquisition message from the second electronic device 102. The first electronic device 101 may be located outside the communication range 106 of the second electronic device 102, and thus may not receive the floor acquisition message.

In operation 803, the first electronic device 101 according to various embodiments may receive media information transmitted by the second electronic device 102. The second electronic device 102 may transmit the media information through a multicasting scheme. The first electronic device 101 may join a group after transmission of the floor acquisition message of the second electronic device 102 and before transmission of the media information. For example, as indicated by reference numeral "105", while the second electronic device 102 makes an utterance, the first electronic device 101 may join a group including the electronic devices 102 to 104. For example, when the location of the first electronic device 101 has changed, the first electronic device 101 may enter the communication range 106 of the second electronic device 102. The first electronic device 101 may move within the communication range of the second electronic device 102. Accordingly, the first electronic device 101 may receive media information multicast from the second electronic device 102.

In operation 805, the first electronic device 101 according to various embodiments may detect an anonymous utterance. The media information received by the first electronic device 101 may not include the user ID of the utterer. According to an embodiment, since the first electronic device 101 has not received the floor acquisition message that has not been multicast before joining the group, the first electronic device 101 may not have information on the user ID of the utterer. In this case, the first electronic device 101 may render the received media information according to the standard specification, but the rendered media information does not have user ID information of the utterer, and thus the utterer may be processed as an anonymous utterer. The first electronic device 101 may render the media information without the utterer's information, thereby detecting that an anonymous utterance has occurred. That is, the first electronic device 101 may recognize media information that does not include the user ID of the utterer as an anonymous utterance.

In operation 807, the first electronic device 101 according to various embodiments may transmit a floor queue position request message. When an anonymous utterance is detected through media rendering having no utterer information, the first electronic device 101 may transmit the floor queue position request message through signaling for updating the anonymous utterer information. The floor queue position request message may be multicast to all electronic devices existing in the same group. Accordingly, other electronic devices 102 to 104 may receive the floor queue position request message. According to an embodiment, the other electronic devices 103 and 104 that do not perform the function of the floor arbitrator may ignore the received floor queue request message, and may not transmit a response message thereto according to contents defined in a standard specification.

In operation 809, the second electronic device 102 according to various embodiments may transmit a floor queue position information message. When the second electronic device 102, as an electronic device that performs the function of the floor arbitrator, receives the floor queue position request message, the second electronic device 102 may transmit a response message according to the standard specification. According to various embodiments, the floor queue position request message may include not only the standby sequence of the utterance, but also user ID information, first synchronization source information, and the like of the electronic device that performs the function of the floor arbitrator.

In operation 811, the first electronic device 101 according to various embodiments may determine and display utterer information. The first electronic device 101 may acquire second synchronization source information through media information received from the second electronic device 102 through a real-time transmission protocol. In addition, the first electronic device 101 may acquire a user ID and first synchronization source information of the electronic device that performs the function of the floor arbitrator through the received floor queue position information message. The first electronic device 101 may compare the first synchronization source information and the second synchronization source information, and may update the user ID of the floor arbitrator with the current utterer information when the first synchronization source information and the second synchronization source information coincide with each other. On the other hand, when the first synchronization source information and the second synchronization source information do not coincide with each other, the first electronic device 101 may repeatedly perform operations 807 to 811 within a range that does not exceed a limited number of times of retry.

As described above, the first electronic device 101 may reduce the incidence of anonymous utterances using floor control messages (e.g., a floor request message, a floor acquisition message, a floor queue position request message, and a floor queue position information message) defined in a standard specification.

Figure 9A:
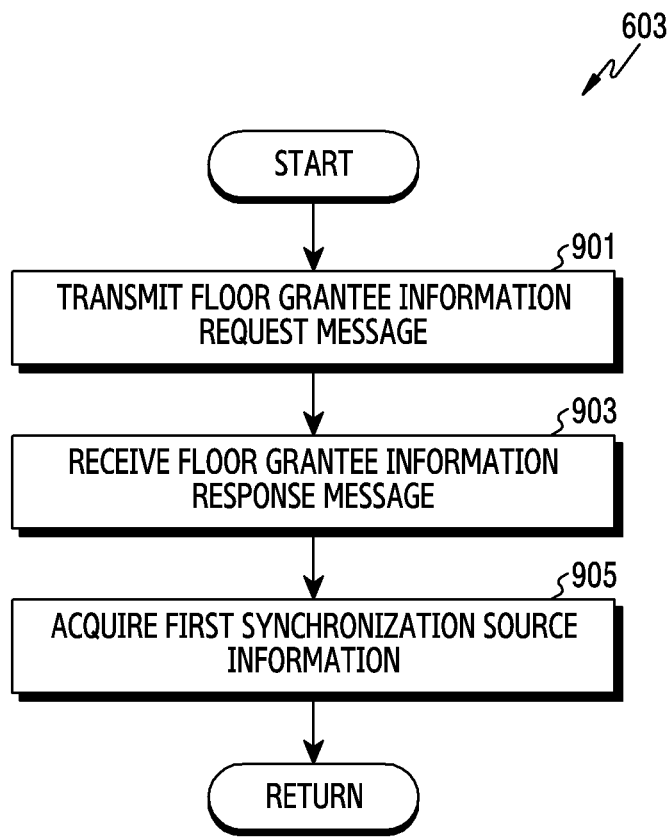
FIG. 9A illustrates a signaling flowchart for utterer information based on a newly defined message according to various embodiments of the disclosure.

FIG. 9A illustrates a signaling flowchart for utterer information based on a newly defined message according to various embodiments of the disclosure. FIG. 9A illustrates an operation method of the first electronic device 101 (e.g., the processor 120). FIG. 9A illustrates a detailed flowchart of operation 603.

Referring to FIG. 9A, in operation 901, the first electronic device 101 according to various embodiments may transmit a floor grantee information request message. For example, the first electronic device 101 may detect that an anonymous utterance has occurred, and transmit a floor grantee information request message so as to update the utterer information. The floor grantee information request message may be multicast to all electronic devices in the same group. A floor grantee information request message according to various embodiments has the same technical meaning as that of the floor queue position request message, and may be a term that differentiates a newly defined message from a message defined in a standard specification. The floor grantee information may include a user ID and first synchronization source information of the electronic device that performs the function of a floor arbitrator. In an embodiment, the first electronic device 101 may transmit a floor grantee information request message at the time of joining a group even before detection of the anonymous utterance. Accordingly, the occurrence of anonymous utterances itself can be reduced.

In operation 903, the first electronic device 101 according to various embodiments may receive a floor grantee information response message. For example, the first electronic device 101 may transmit the floor grantee information request message, and may receive the floor grantee information response message for a predefined period of time T. The predefined period of time T may be defined in consideration of a communication delay time. For example, the predefined period of time T may be defined in various formats based on information, such as the number of electronic devices in the same group, the channel state between electronic devices, the remaining amount of a battery charges, and the like. According to the newly defined message, all electronic devices may transmit the floor grantee information response message. Electronic devices that have already joined the group may receive the floor acquisition message, and thus recognize the user ID of the electronic device that performs the function of a floor arbitrator. Accordingly, the floor grantee information response message may be generated such that the user ID of the electronic device that performs the function of the floor arbitrator is included in the floor grantee information response message. In an embodiment, when the floor grantee information response message is not received for a predefined period of time T, the first electronic device 101 may repeatedly transmit the floor grantee information request message.

In operation 905, the first electronic device 101 according to various embodiments may acquire first synchronization source information. The first electronic device 101 may receive a floor grantee information response message from at least one other electronic device. The floor grantee information response message may receive not only the user ID of the electronic device performing the function of a floor arbitrator, but also the first synchronization source information. The synchronization source information may be information indicating a source for generating a real-time transport protocol packet.

Figure 9B:
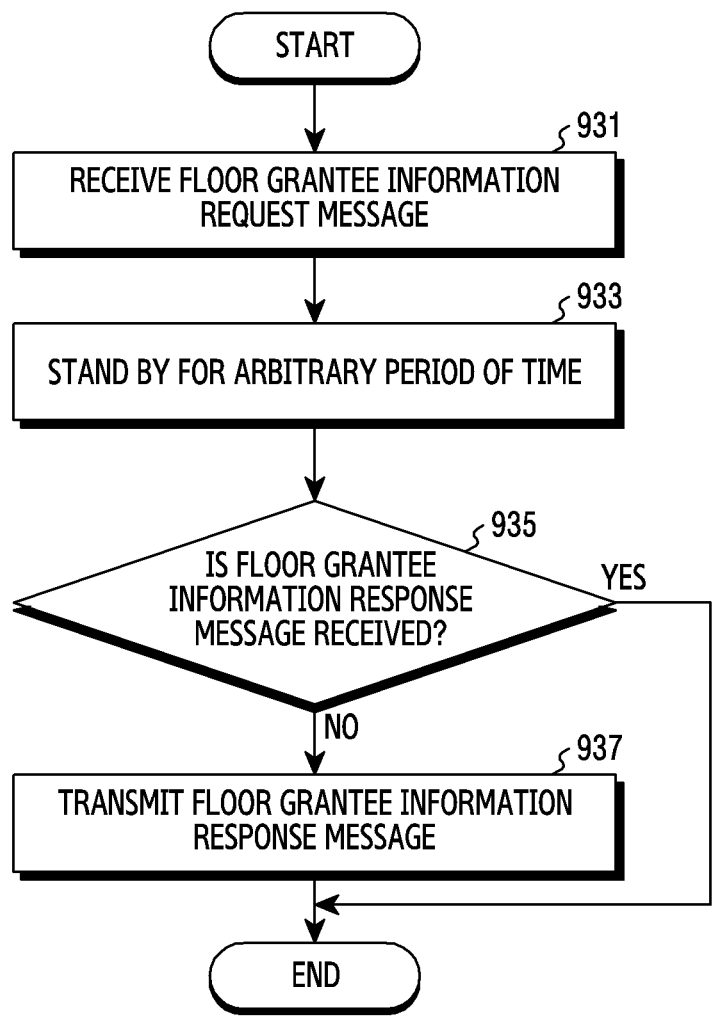
FIG. 9B is a flowchart illustrating transmission or reception, which is performed by another electronic device, to or from an electronic device according to various embodiments of the disclosure.

FIG. 9B is a flowchart illustrating transmission or reception, which is performed by another electronic device, to and from an electronic device according to various embodiments of the disclosure. FIG. 9B illustrates a method for operating other electronic devices 102 to 104 (e.g., the second electronic device 102).

Referring to FIG. 9B, in operation 931, the second electronic device 102 according to various embodiments may receive a floor grantee information request message. The floor grantee information request message may be a message transmitted from the first electronic device 101 that detected the anonymous utterance. Since the floor grantee information message does not conform to a standard specification, the second electronic device 102 may not ignore the floor grantee information request message even when receiving the floor grantee information request message.

In operation 933, the second electronic device 102 according to various embodiments may stand by for a predetermined period of time. For example, the second electronic device 102 may stand by for a period of time T2, the electronic device 103 may stand by for a period of time T3, and the electronic device 104 may stand by for a period of time T4. Since the time periods of T2 to T4 are arbitrarily determined, T2 to T4 may be different or the same. According to an embodiment, time periods of T2 to T4 may be calculated to have different values based on a media access address (MAC) value or a user ID value of an electronic device, but are not limited thereto.

In operation 935, the second electronic device 102 according to various embodiments may determine whether a floor grantee information response message has been received. Unlike a standard specification, an electronic device that has received the floor grantee information request message may transmit a floor grantee information response message even if the electronic device is a device that does not perform the function of a floor arbitrator. An utterer information response message transmitted by an electronic device that does not perform the function of the floor arbitrator may be multicast to all electronic devices in the same group. Accordingly, the second electronic device 102 may receive a floor grantee information response message from the electronic device that does not perform the function of the floor arbitrator, and may identify transmission of the floor grantee information response message of the electronic device that does not perform the function of the floor arbitrator. In an embodiment, when the floor grantee information response message is received from another electronic device during an arbitrary standby time, the second electronic device 102 may determine that the first electronic device 101 has received the floor grantee information response message. In this case, the second electronic device 102 may determine that the first electronic device 101 has received a user ID of an electronic device that performs the function of the floor arbitrator, and may end a procedure even before transmission of the floor grantee information response message. In another embodiment, when the floor grantee information response message is not received from another electronic device during an arbitrary standby time, the second electronic device 102 may determine that the first electronic device 101 has not received the floor grantee information response message yet.

In operation 937, the second electronic device 102 according to various embodiments may transmit a floor grantee information response message. For example, when the floor grantee information response message is not received from another electronic device within an arbitrary standby time, the second electronic device 102 may transmit a floor grantee information response message after a standby time has elapsed. The second electronic device 102 may first receive a floor acquisition message from the electronic device that performs the function of the floor arbiter, and may store a user ID. In addition, the second electronic device 102 may store the second synchronization source information of a real-time transmission protocol through the received media information. Therefore, the second electronic device 102 may add the user ID and the second synchronization source information of the electronic device that performs the function of the floor arbitrator to the floor grantee information response message, and transmit the same.

Figure 10:
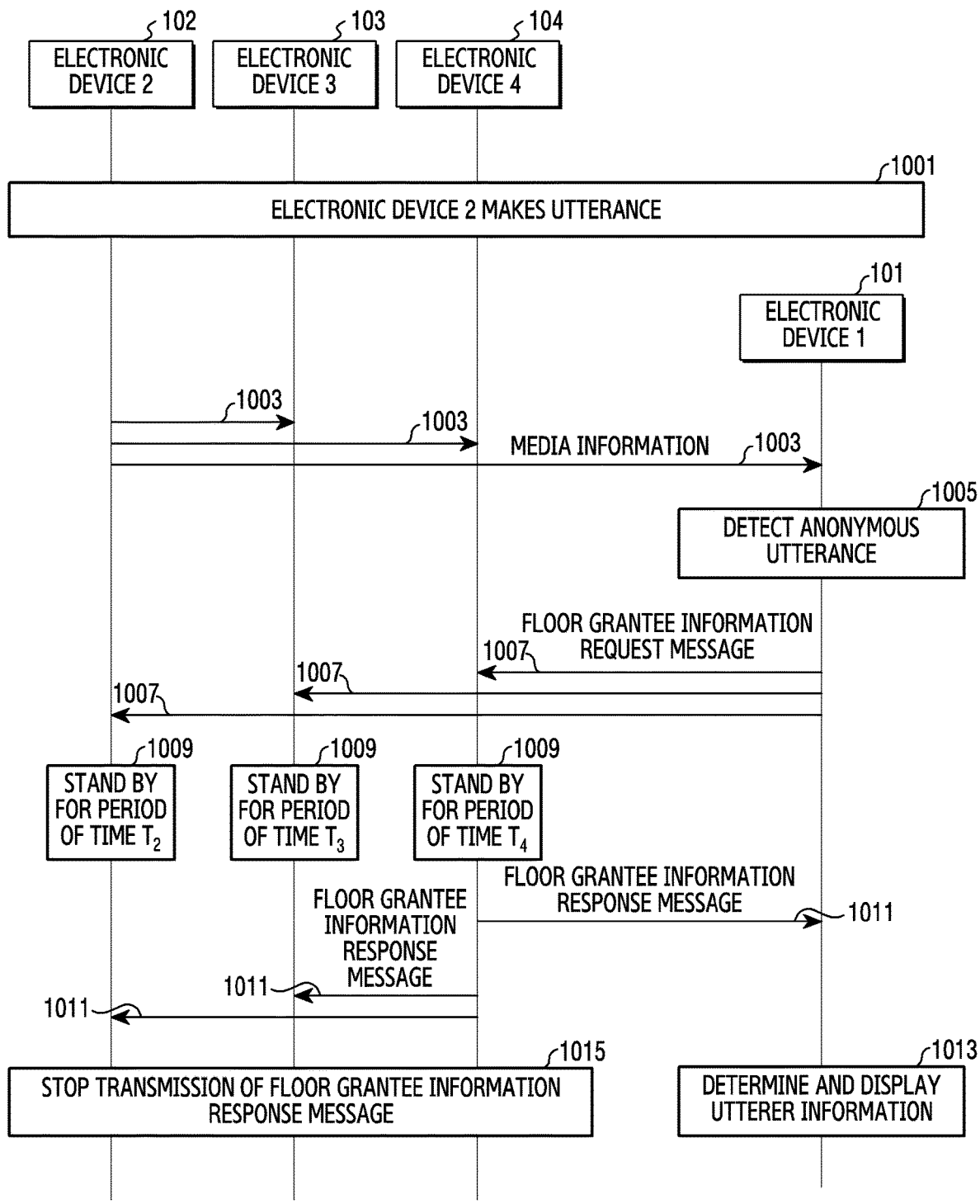
FIG. 10 illustrates a signal exchange diagram for utterer information based on a newly defined message according to various embodiments of the disclosure.

FIG. 10 illustrates a signal exchange diagram for utterer information according to a newly defined message according to various embodiments of the disclosure. FIG. 10 illustrates an operation method of the first electronic device 101 (e.g., the processor 120).

Referring to FIG. 10, in operation 1001, the second electronic device 102 according to various embodiments may be in a state of uttering. The utterance made by the second electronic device 102 may be the transmission of media information. According to various embodiments, operation 1001 may correspond to operation 501 of FIG. 5A and operation 801 of FIG. 8.

In operation 1003, the first electronic device 101 according to various embodiments may receive media information from the second electronic device 102. For example, the first electronic device 101 may join a group after transmission of a floor acquisition message by the second electronic device 102. According to an embodiment, the media information may be multicast to all clients in the group, and the first electronic device 101 may receive the media information.

In operation 1005, the first electronic device 101 according to various embodiments may detect an anonymous utterance. The media information received in operation 1003 may not include information on a user ID of the utterer. In addition, the first electronic device 101 may not receive the floor acquisition message after joining the group. Accordingly, the first electronic device 101 may render the received media information, but may render media information not including the user ID of the utterer. That is, the first electronic device 101 may recognize, as an anonymous utterance, media information that does not include the user ID of the utterer, and indicate that the media information is an anonymous utterance through the display 330.

In operation 1007, the first electronic device 101 according to various embodiments may transmit a floor grantee information request message. In response to detection of the anonymous utterance, the first electronic device 101 may transmit a floor grantee information request message in order to acquire the utterer information. According to various embodiments, the floor grantee information request message may be a message that is not defined in a standard specification. The first electronic device 101 may multicast the floor grantee information request message to all electronic devices in the group.

In operation 1009, the electronic devices 102 to 104 according to various embodiments may stand by for an arbitrary period of time T2 to T4. According to various embodiments, T2 to T4 may be different for each of the electronic devices 102 to 104. For example, an arbitrary time may be calculated based on a media access (MAC) address or a user ID of each of the electronic devices 102 to 104. The calculation of arbitrary time according to an embodiment is not limited to the MAC address or user ID, and may be calculated based on other information having a value specific to each device. According to another embodiment, the electronic devices 102 to 104 may perform an operation of transmitting a floor grantee information response message without standing by for an arbitrary period of time.

In operation 1011, the electronic device 104 according to various embodiments may transmit a floor grantee information response message. For example, the electronic device 104 may stand by for an arbitrary period of time T, calculated based on a device-specific value, and may then transmit a floor grantee information response message. According to the message defined in a standard specification, the electronic device 104 that does not perform the function of a floor arbitrator does not transmit a response message to the request, and the corresponding request message may be ignored. On the other hand, according to a newly defined message, the electronic device 104 that does not perform the function of the floor arbitrator may transmit a floor grantee information response message. In this case, since multiple electronic devices transmit the response message, packet loss may be reduced. In addition, in the case where the electronic device that performs the function of the floor arbitrator cannot perform an operation of transmitting the response message, other electronic devices may transfer information about the user ID of the electronic device that performs the function of the floor arbitrator. According to an embodiment, when the second electronic device 102 or the electronic device 103 has a shorter time T2 or T3, the second electronic device 102 or the electronic device 103 may first transmit the floor grantee information response message. Each of the electronic devices 102 to 104 may transmit the floor grantee information response message after an arbitrary time, which is different for each device, so as to reduce a packet loss rate in the D2D-based off-network MCPTT having a half-duplex characteristic.

In operation 1013, the first electronic device 101 according to various embodiments may determine and display utterer information. For example, the first electronic device 101 may receive a floor grantee information response message from one or more other electronic devices, and may acquire a user ID and synchronization source information of the electronic device that performs the function of the floor arbitrator, the user ID and synchronization source information being included in the message. Therefore, the first electronic device 101 compares the second synchronization source information included in the real-time transmission protocol with the first synchronization source information included in the message, and as a result of the comparison, when the second synchronization source information coincides with the first synchronization source information, the first electronic device 101 may update the floor arbitrator using the user ID of the electronic device that performs the function of the floor arbitrator, and display the same through the display 330.

In operation 1015, the electronic devices 102 and 103 according to various embodiments may stop transmission of the floor grantee information response message. For example, when the floor grantee information response message is received from the electronic device 104, the electronic devices 102 and 103 may recognize that the electronic device 104 having a shorter time T has transmitted the floor grantee information response message. Accordingly, the electronic devices 102 and 103 may determine that the first electronic device 101 that requested the floor grantee information has received the floor grantee information response message. Accordingly, since the first electronic device 101 has received a required message, the electronic devices 102 and 103 may stop transmission of the floor grantee information response message. According to an embodiment, the electronic devices 102 and 103 may perform transmission of the floor grantee information response message even though the electronic devices 102 and 103 have received the floor grantee information response message. For example, if message transmission failure is a highly probable, for example, if the channel state measured by a terminal does not exceed a predetermined level or the number of times of packet loss exceeds a pre-configured number of times, the electronic devices 102 and 103 may transmit the floor grantee information response message.

Figure 11:
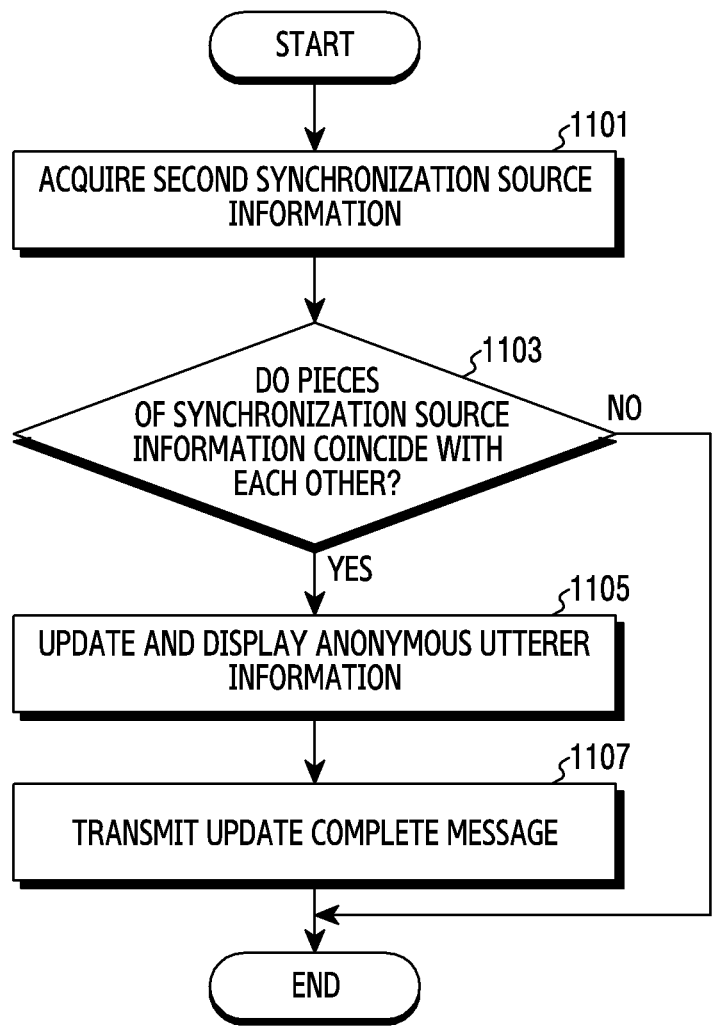
FIG. 11 is another detailed example describing the determination and display of utterer information according to various embodiments of the disclosure.

FIG. 11 illustrates a flowchart for determination and display of utterer information according to various embodiments of the disclosure. FIG. 11 illustrates an operation method of the first electronic device 101 (e.g., the processor 120).

Referring to FIG. 11, in operation 1101, the first electronic device 101 according to various embodiments may acquire second synchronization source information. For example, the first electronic device 101 may acquire second synchronization source information included in a header of a received packet. Operation 1101 may correspond to operation 711 of FIG. 7B.

In operation 1103, the first electronic device 101 according to various embodiments may determine whether pieces of synchronization source information coincide with each other. For example, the first electronic device 101 may identify whether the first synchronization source information included in the floor grantee information response message is the same as the second synchronization source information included in the media information through comparison thereof. In an embodiment, when the first synchronization source information does not coincide with the second synchronization source information, the first electronic device 101 may determine that the electronic device transmitting the media information is not the electronic device that currently performs the function of a floor arbitrator. In this case, the first electronic device 101 may end the procedure. In another embodiment, when the first synchronization source information does not coincide with the second synchronization source information, the first electronic device 101 may perform a retry procedure for acquiring anonymous utterer information without ending the procedure. According to an embodiment, when the retry procedure exceeds a pre-configured number of times of retry, the first electronic device 101 may maintain anonymous utterer information.

In operation 1105, the first electronic device 101 according to various embodiments may update the anonymous utterer information. For example, when the first synchronization source information and the second synchronization source information coincide with each other, the first electronic device 101 may determine that the electronic device that transmits the media information and the electronic device performing the function of the current speech arbiter are the same electronic device. Accordingly, the first electronic device 101 may update and display the anonymous utterer information through the user ID of the electronic device that performs the function of the floor arbitrator, the user ID being included in the received floor grantee information response message.

In operation 1107, the first electronic device 101 according to various embodiments may transmit an update complete message. The first electronic device 101 may complete update of the anonymous utterer information and transmit the update complete message to other electronic devices in the group. Accordingly, the other electronic devices may recognize that the update of the anonymous utterer information of the first electronic device 101 has been completed. The other electronic devices may stop transmission of the floor grantee information response message.

Various embodiments of the disclosure may provide a method for acquiring user information by an electronic device. The method may include: receiving media information that does not include utterer information; performing signaling for acquisition of utterer information relating to the media information; and determining and displaying the utterer information.

According to various embodiments of the disclosure, the performing of the signaling may include: transmitting a floor queue position request message; receiving a floor queue position response message; and acquiring first synchronization source information from the floor queue position response message.

According to various embodiments of the disclosure, the determining and displaying of the utterer information may include: comparing first synchronization source information of a floor queue position response message and second synchronization source information of the media information.

According to various embodiments of the disclosure, the comparing of the first synchronization source information and the second synchronization source information may include: when the first synchronization source information and the second synchronization source information coincide with each other, updating anonymous utterer information with user information of a floor arbitrator, the user information being included in the floor queue position response message; and when the first synchronization source information and the second synchronization source information do not coincide with each other, performing signaling again for acquisition of the utterer information.

According to various embodiments of the disclosure, the performing of the signaling again for acquisition of the utterer information may further include: determining whether a number of times of retry exceeds a pre-configured number of times of retry; maintaining anonymous utterer information when the number of times of retry exceeds the pre-configured number of times of retry; and transmitting a floor queue position information request message when the number of times of retry does not exceed the pre-configured number of times of retry.

According to various embodiments of the disclosure, the performing of the signaling again for acquisition of the utterer information may include: transmitting a floor grantee information request message; receiving a floor grantee information response message; and acquiring first synchronization source information. The floor grantee information response message may include user information of the floor arbitrator that is transmitting the media information and the first synchronization source information.

According to various embodiments of the disclosure, the determining and displaying of the utterer information may include comparing first synchronization source information of a floor grantee information response message and second synchronization source information of the media information.

According to various embodiments of the disclosure, an operation method of the electronic device may further include transmitting an update complete message for the utterer information.

According to various embodiments of the disclosure, an operation method of the electronic device may further include: receiving the floor grantee information request message; in response to reception of the floor grantee information request message, determining whether to receive a floor grantee information response message; determining whether the floor grantee information response message is received within a standby time; and transmitting the floor grantee information response message when the floor grantee information response message is not received within the standby time.

According to various embodiments of the disclosure, an operation method of the electronic device may include canceling transmission standby of the response message when the floor grantee information response message is received within the standby time.

As used herein, the term "module" includes, for example, a unit including a combination of one or more of hardware, software, or firmware, and may be interchangeably used with terms such as, for example, logic, a logical block, a component, or a circuit. The "module" may be an integrated element, or a minimum unit for performing one or more functions or a part thereof. The "module" may be mechanically or electronically implemented, and may include, for example, an application-specific integrated circuit (ASIC) chip, field-programmable gate arrays (FPGAs), or a programmable logic device which performs some operations thereof, and which are currently known, or have yet to be developed.

At least a part of an apparatus (e.g., modules or functions thereof) or method (e.g. operations) according to various embodiments may be implemented by instructions which are stored, for example, in computer-readable storage media (e.g., the memory 130, the memory 230, and the memory 620) in the form of a program module. When the instructions are executed by a processor (e.g., the processor 120, the processor 210, or the processor 610), the processor may perform functions corresponding to the instructions.

The computer-readable recording media may include a hard disk, a floppy disk, magnetic media (e.g., a magnetic tape), optical media (e.g., a compact disc read-only memory (CD-ROM), a digital versatile disc (DVD), magneto-optical media (e.g., a floptical disk), an internal memory, and the like. The instruction may include code made by a complier or code that can be executed by an interpreter.

The programming module according to various embodiments may include one or more of the aforementioned components or may further include other additional components, or some of the aforementioned components may be omitted. The operations performed by modules, programming modules, or other elements according to various embodiments may be performed in a sequential, parallel, repetitive, or heuristic manner, and some of the operations may be performed in different orders or omitted, or other operations may be added.

The invention claimed is:

1. An electronic device comprising:
   a communication module;
   a display;
   at least one processor electrically connected to the communication module and the display; and
   a memory electrically connected to the processor, wherein, when executed, the memory causes the processor to:
      receive media information that does not include utterer information;
      perform signaling for acquisition of utterer information relating to the media information, the signaling comprising transmitting a floor queue position request message, receiving a floor queue position response message, and acquiring synchronization source information from the floor queue position response message, and
      determine and display the utterer information.

2. The electronic device of claim 1, wherein, for the determination and display, the processor is configured to compare first synchronization source information of a floor queue position response message and second synchronization source information of the media information.

3. The electronic device of claim 2, wherein, when the first synchronization source information coincides with the second synchronization source information, the processor is configured to:
   update anonymous utterer information with user information of a floor arbitrator, the user information being included in the floor queue position response message; and
   perform signaling again for acquisition of the utterer information when the first synchronization source information and the second synchronization source information do not coincide with each other.

4. The electronic device of claim 3, wherein, for the performing of the signaling again, the processor is configured to:
   determine whether a number of times of retry exceeds a pre-configured number of times of retry;
   maintain the anonymous utterer information when the number of times of retry has exceeded the predetermined number of times of retry; and
   transmit a floor queue position information request message when the number of times of retry does not exceed the pre-configured number of times of retry.

5. The electronic device of claim 1, wherein, for the signaling, the processor is configured to:
   transmit a floor grantee information request message;
   receive a floor grantee information response message; and
   acquire first synchronization source information, wherein the floor grantee information response message includes user information of a floor arbitrator, which is transmitting the media information, and the first synchronization source information.

6. The electronic device of claim 5, wherein, for the determination and display, the processor is configured to:
   compare first synchronization source information of the floor grantee information response message and second synchronization source information of the media information; and
   based on a result of the comparison, further transmit an update complete message for the utterer information.

7. The electronic device of claim 5, wherein the processor is configured to:
   receive the floor grantee information request message;
   in response to reception of the floor grantee information request message, determine whether to receive the floor grantee information response message;
   determine whether the floor grantee information response message is received within a standby time;
   transmit the floor grantee information response message when the floor grantee information response message is not received within the standby time; and
   cancel transmission standby of the floor grantee information response message when the floor grantee information response message is received within the standby time.

8. An operation method of an electronic device, comprising:
   receiving media information that does not include utterer information;
   performing signaling for acquisition of utterer information relating to the media information, the signaling comprising transmitting a floor queue position request message, receiving a floor queue position response message, and acquiring synchronization source information from the floor queue position response message; and
   determining and displaying the utterer information.

9. The method of claim 8, wherein the determining and displaying of the utterer information comprises:
   comparing first synchronization source information of a floor queue position response message and second synchronization source information of the media information;
   updating anonymous utterer information with user information of a floor arbitrator, the user information being included in the floor queue position response message, when the first synchronization source information and the second synchronization source information coincide with each other; and
   performing signaling again for acquisition of the utterer information when the first synchronization source information and the second synchronization source information do not coincide with each other.

10. The method of claim 9, wherein the performing of the signaling again for acquisition of the utterer information further comprises:
    determining whether a number of times of retry exceeds a pre-configured number of times of retry;
    maintaining the anonymous utterer information when the number of times of retry has exceeded the pre-configured number of times of retry; and
    transmitting a floor queue position information request message when the number of times of retry does not exceed the pre-configured number of times of retry.

11. The method of claim 9, wherein the performing of the signaling for the utterer information comprises:

transmitting a floor grantee information request message;
receiving a floor grantee information response message; and
acquiring first synchronization source information,
wherein the floor grantee information response message includes user information of a floor arbitrator, which is transmitting the media information, and the first synchronization source information.

12. The method of claim 11, further comprising:
receiving the floor grantee information request message;
in response to reception of the floor grantee information request message, determining whether to receive a floor grantee information response message;
determining whether the floor grantee information response message is received within a standby time;
transmitting the floor grantee information response message when the floor grantee information response message is not received within the standby time; and
canceling transmission standby of the response message when the floor grantee information response message is received within the standby time.

13. The method of claim 9, wherein the determining and displaying of the utterer information comprises:
comparing first synchronization source information of a floor grantee information response message and second synchronization source information of the media information; and
based on a result of the comparison, transmitting an update complete message for the utterer information.

* * * * *